(12) United States Patent
Mimura et al.

(10) Patent No.: US 12,402,059 B2
(45) Date of Patent: Aug. 26, 2025

(54) MANAGEMENT APPARATUS, MANAGEMENT SYSTEM, AND MANAGEMENT METHOD

(71) Applicant: Hitachi, Ltd., Tokyo (JP)

(72) Inventors: Nodoka Mimura, Tokyo (JP); Masayuki Takase, Tokyo (JP); Takeshi Shibata, Tokyo (JP); Kunihiko Toumura, Tokyo (JP); Dai Akashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 18/095,810

(22) Filed: Jan. 11, 2023

(65) Prior Publication Data
US 2024/0236808 A1 Jul. 11, 2024

(51) Int. Cl.
*H04W 40/12* (2009.01)
*H04L 67/12* (2022.01)

(52) U.S. Cl.
CPC ............. *H04W 40/12* (2013.01); *H04L 67/12* (2013.01)

(58) Field of Classification Search
CPC ............................... H04W 40/12; H04L 67/12
See application file for complete search history.

(56) References Cited

U.S. PATENT DOCUMENTS

| | | | | |
|---|---|---|---|---|
| 2007/0177522 A1* | 8/2007 | Okitsu | ........... | H04L 41/082 370/468 |
| 2014/0306833 A1* | 10/2014 | Ricci | ........... | G06V 40/28 340/901 |
| 2023/0043362 A1* | 2/2023 | Kita | ........... | H04L 41/5054 |
| 2023/0084312 A1* | 3/2023 | Cui | ........... | G01C 21/3492 701/533 |
| 2023/0388908 A1* | 11/2023 | Wang | ........... | H04W 48/18 |
| 2024/0142180 A1* | 5/2024 | Yang | ........... | F28D 15/02 |
| 2024/0397382 A1* | 11/2024 | Liu | ........... | H04W 28/0252 |

FOREIGN PATENT DOCUMENTS

| | | | |
|---|---|---|---|
| JP | 2020-502948 A | | 1/2020 |
| JP | 2020-140276 A | | 9/2020 |

* cited by examiner

*Primary Examiner* — Michael A Keller
*Assistant Examiner* — Thao D Duong
(74) *Attorney, Agent, or Firm* — Foley & Lardner LLP

(57) ABSTRACT

A management apparatus specifies a first communication path requirement template corresponding to a first communication path requirement of a first application module and a second communication path requirement template corresponding to a second communication path requirement of a second application module, determines the available communication module included in the first communication path requirement template to be a first communication module and determines the available communication module included in the second communication path requirement template to be a second communication module, determines an arrangement destination of the first communication module to be a first arrangement destination, and determines an arrangement destination of the second communication module to be a second arrangement destination, and sets a communication path by arranging the first application module and the first communication module in the first arrangement destination and arranging the second application module and the second communication module in the second arrangement destination.

9 Claims, 23 Drawing Sheets

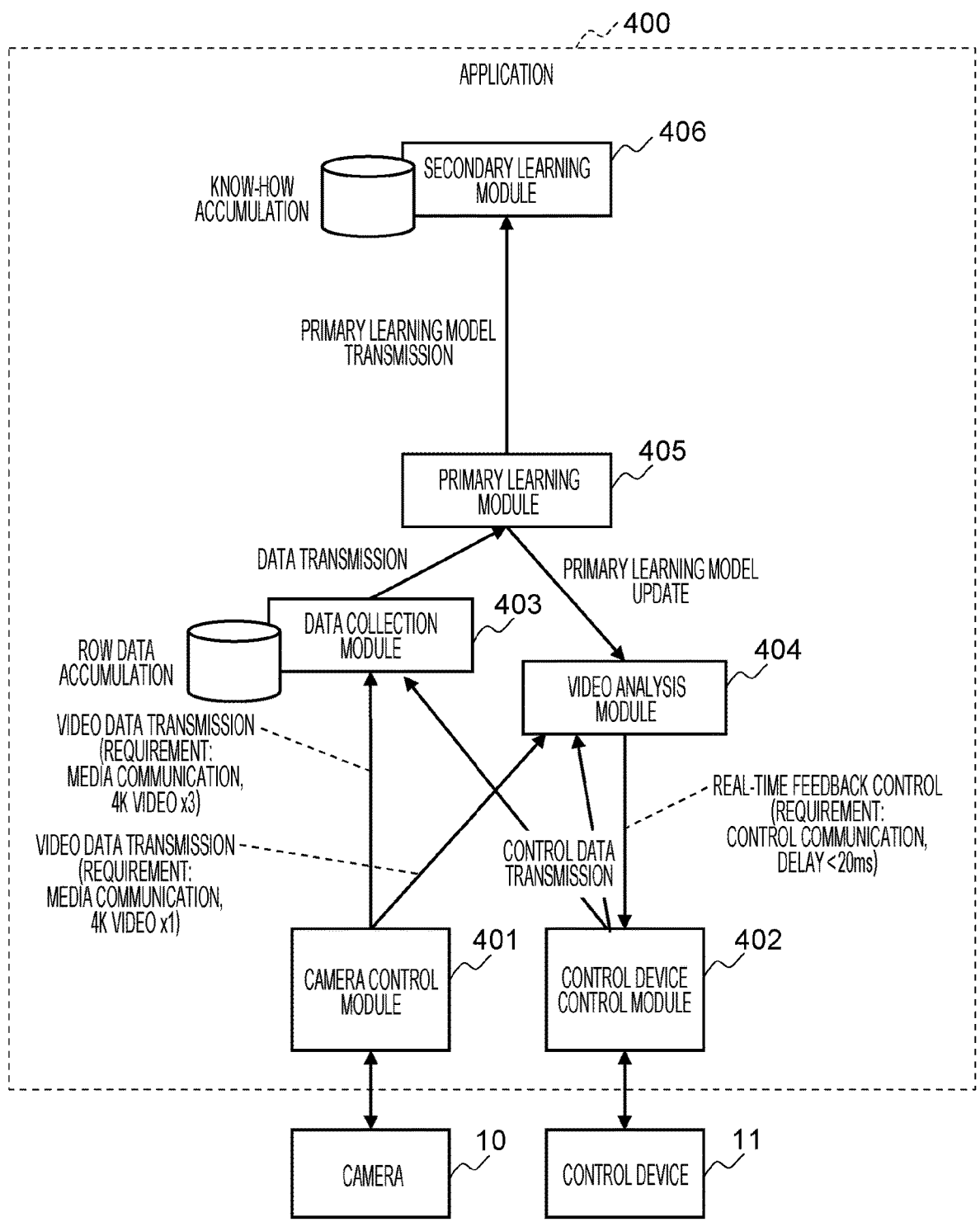

FIG. 5

500 RESOURCE MANAGEMENT TABLE

| 501 MANAGEMENT IDENTIFIER | 502 IoT DEVICE | 503 RETAINMENT INTERFACE | 504 AVAILABLE COMPUTER RESOURCE (ADDRESS) | 505 POSITION | METRIC INFORMATION (DELAY, JITTER, BANDWIDTH, PER) | | |
|---|---|---|---|---|---|---|---|
| | | | | | 507 VIA LOCAL 5G | 508 VIA WIRELESS LAN | 509 VIA PUBLIC 5G |
| IGW 1111 | IoT GATEWAY | LOCAL 5G, WIRELESS LAN, PUBLIC 5G | CLOUD PROCESSING SERVER (C1.cloud.jp) | PUBLIC AREA | 80ms 30ms 30Mbps 10E-4 | 80ms 50ms 30Mbps 10E-2 | 80ms 30ms 30Mbps 10E-4 |
| | | | EDGE PROCESSING SERVER @PUBLIC 5G (E2.mobile.jp) | CLOSED AREA | 50ms 30ms 40Mbps 10E-4 | 50ms 50ms 40Mbps 10E-2 | 30ms 15ms 50Mbps 10E-4 |
| | | | EDGE PROCESSING SERVER @FACTORY LAN (E3.fab.local) | CLOSED AREA | 30ms 10ms 60Mbps 10E-4 | 30ms 20ms 100Mbps 10E-2 | — |
| | | | EDGE PROCESSING SERVER @LOCAL 5G (E4.mobile.local) | CLOSED AREA | 10ms 10ms 80Mbps 10E-4 | — | — |
| IGW 2222 | ... | ... | ... | | ... | ... | ... |

FIG. 6

600 — APPLICATION REQUIREMENT TABLE

| APPLICATION (601) | APPLICATION MODULE (602) | ARRANGEMENT POSITION (603) | COMMUNICATION PATH REQUIREMENT TARGET (604) | COMMUNICATION PATH REQUIREMENT (605) | COMMUNICATION PATH DIRECTION (606) |
|---|---|---|---|---|---|
| App-A | SECONDARY LEARNING MODULE | ANY | — | — | — |
| | PRIMARY LEARNING MODULE | CLOSED AREA | — | — | — |
| | DATA COLLECTION MODULE | CLOSED AREA | CAMERA CONTROL MODULE | MEDIA COMMUNICATION, 4K VIDEO x3 | ← (REVERSE DIRECTION) |
| | VIDEO ANALYSIS MODULE | CLOSED AREA | CONTROL DEVICE CONTROL MODULE | CONTROL COMMUNICATION, DELAY<20ms | → (FORWARD DIRECTION) |
| | | | CAMERA CONTROL MODULE | MEDIA COMMUNICATION, 4K VIDEO x1 | ← (REVERSE DIRECTION) |
| | CAMERA CONTROL MODULE | FIELD AREA | DATA COLLECTION MODULE | MEDIA COMMUNICATION, 4K VIDEO x3 | → (FORWARD DIRECTION) |
| | | | VIDEO ANALYSIS MODULE | MEDIA COMMUNICATION, 4K VIDEO x1 | → (FORWARD DIRECTION) |
| | CONTROL DEVICE CONTROL MODULE | FIELD AREA | VIDEO ANALYSIS MODULE | CONTROL COMMUNICATION, DELAY<20ms | ← (REVERSE DIRECTION) |
| App-B | ... | ... | ... | ... | ... |

FIG. 7

700 — APPLICATION MANAGEMENT TABLE

| MANAGEMENT IDENTIFIER (501) | APPLICATION IDENTIFIER (601) | CLASSIFICATION (701) | MODULE (702) | MODULE ADDRESS (703) | ARRANGEMENT POSITION ADDRESS (704) |
|---|---|---|---|---|---|
| IGW 1111 | App-A | APPLICATION MODULE | SECONDARY LEARNING MODULE | 10.0.1.10 | C1.cloud.jp |
| | | | PRIMARY LEARNING MODULE | 10.0.3.10 | E3.fab.local |
| | | | DATA COLLECTION MODULE | 10.0.3.20 | E3.fab.local |
| | | | VIDEO ANALYSIS MODULE | 10.0.4.10 | E4.mobile.local |
| | | | CAMERA CONTROL MODULE | 10.0.5.10 | IGW1111 |
| | | | CONTROL DEVICE CONTROL MODULE | 10.0.5.20 | IGW1111 |
| | | COMMUNICATION MODULE | BROADBAND COMMUNICATION MODULE | 10.0.3.254 | E3.fab.local |
| | | | BROADBAND COMMUNICATION MODULE | 10.0.5.254 | IGW1111 |
| | | | HIGHLY-RELIABLE COMMUNICATION MODULE | 10.0.4.254 | E4.mobile.local |
| | | | HIGHLY-RELIABLE COMMUNICATION MODULE | 10.0.5.253 | IGW1111 |
| | App-B | ... | ... | ... | ... |
| IGW 2222 | ... | ... | ... | ... | ... |

FIG. 8

| COMMUNICATION MODULE NAME | DESCRIPTION | PROVISION FORM | COMMUNICATION FORM | CONFIGURATION | STORAGE DESTINATION |
|---|---|---|---|---|---|
| HIGHLY-RELIABLE COMMUNICATION MODULE | PACKET DUPLICATION TRANSFER IN PLURALITY OF PATHS | CONTAINER | GATEWAY | POINT-TO-POINT | h-reliable. repo.cloud.jp |
| BROADBAND COMMUNICATION MODULE | AGGREGATION OF PLURALITY OF PATHS | CONTAINER | GATEWAY | POINT-TO-POINT | path-aggre. repo.cloud.jp |
| JITTER REDUCTION COMMUNICATION MODULE | PACKET JITTER ABSORPTION BUFFER | CONTAINER | GATEWAY | POINT-TO-POINT | jitter-buf. repo.cloud.jp |
| WAF COMMUNICATION MODULE | WAF | VIRTUAL MACHINE | PROXY | SINGLE | waf. repo.cloud.jp |
| ... | ... | ... | ... | ... | ... |

Columns: 801, 802, 803, 804, 805, 806
800 — COMMUNICATION MODULE REPOSITORY

FIG. 9

900 — COMMUNICATION PATH REQUIREMENT TEMPLATE TABLE

| COMMUNICATION PATH REQUIREMENT DEFINITION 901 | | AVAILABLE COMMUNICATION MODULE 902 | AVAILABLE SETTING 903 |
|---|---|---|---|
| CLASSIFICATION 911 | CONDITION 912 | | |
| CONTROL COMMUNICATION | DELAY < X [ms] | HIGHLY-RELIABLE COMMUNICATION MODULE | COMMUNICATION PATH CONDITION: DELAY < X [ms], PER < 10E-3<br>COMMUNICATION PATH NUMBER SETTING: 2<br>COMMUNICATION PATH QoS SETTING: WIRELESS TOP PRIORITY, WIRED TOP PRIORITY |
| | TRANSMISSION INTERVAL = Y [ms], JITTER < Z [ms] | JITTER REDUCTION COMMUNICATION MODULE | COMMUNICATION PATH CONDITION: DELAY < X [ms], PER < 10E-3<br>COMMUNICATION PATH QoS SETTING: WIRELESS TOP PRIORITY, WIRED TOP PRIORITY<br>BUFFER SETTING: M PACKETS SECURING, DEQUEUE INTERVAL Y [ms] |
| | ... | ... | ... |
| MEDIA COMMUNICATION | 4K VIDEO xN | BROADBAND COMMUNICATION MODULE | COMMUNICATION PATH CLASSIFICATION: 5G, WIRELESS LAN<br>BAND ALLOCATION: 5G P [bps], WIRELESS LAN 40 [Mbps] × N−P [bps] |
| | ... | ... | ... |
| SECURE COMMUNICATION | REST API | WAF COMMUNICATION MODULE | NONE |
| | ... | ... | ... |

FIG. 11A

| MANAGEMENT IDENTIFIER | TRANSMISSION SOURCE ADDRESS 1101 | DESTINATION ADDRESS 1102 | GATEWAY 1103 |
|---|---|---|---|
| IGW 1111 | 10.0.3.10 (PRIMARY LEARNING MODULE) | ANY | Default |
|  | 10.0.3.20 (DATA COLLECTION MODULE) | 10.0.5.10 (CAMERA CONTROL MODULE) | 10.0.3.254 (BROADBAND COMMUNICATION MODULE) |
|  | ... | ANY | Default |
| IGW 2222 | ... | ... | ... |

| MANAGEMENT IDENTIFIER (501) | TRANSMISSION SOURCE ADDRESS (1101) | DESTINATION ADDRESS (1102) | GATEWAY (1103) |
|---|---|---|---|
| IGW 1111 | 10.0.4.10 (VIDEO ANALYSIS MODULE) | 10.0.5.20 (CONTROL DEVICE CONTROL MODULE) | 10.0.4.254 (HIGHLY-RELIABLE COMMUNICATION MODULE) |
| IGW 2222 | ... | ANY | Default |
| | ... | ... | ... |

| MANAGEMENT IDENTIFIER 501 | TRANSMISSION SOURCE ADDRESS 1101 | DESTINATION ADDRESS 1102 | GATEWAY 1103 |
|---|---|---|---|
| IGW 1111 | 10.0.5.10 (CAMERA CONTROL MODULE) | 10.0.3.20 (DATA COLLECTION MODULE) | 10.0.5.254 (BROADBAND COMMUNICATION MODULE) |
| | | ANY | Default |
| | 10.0.5.20 (CONTROL DEVICE CONTROL MODULE) | 10.0.4.10 (VIDEO ANALYSIS MODULE) | 10.0.5.253 (HIGHLY-RELIABLE COMMUNICATION MODULE) |
| | | ANY | Default |
| | ... | ... | ... |

| MANAGEMENT IDENTIFIER ~1101 | TRANSMISSION SOURCE ADDRESS ~1102 | TRANSMISSION DESTINATION ADDRESS ~1103 | GATEWAY ~1104 |
|---|---|---|---|
| IGW 1111 | 10.0.1.10 (SECONDARY LEARNING MODULE) | ANY | Default |
| IGW 2222 | ... | ... | ... |

DEPLOYMENT PROCESSING RESULT 1400

| MANAGEMENT IDENTIFIER 501 | APPLICATION IDENTIFIER 601 | CLASSIFICATION 701 | MODULE 702 | MODULE ADDRESS 703 | ARRANGEMENT POSITION ADDRESS 704 |
|---|---|---|---|---|---|
| IGW 1111 | App-A | APPLICATION MODULE | SECONDARY LEARNING MODULE | 10.0.1.10 | C1.cloud.jp |
| | | | PRIMARY LEARNING MODULE | 10.0.3.10 | E3.fab.local |
| | | | DATA COLLECTION MODULE | 10.0.3.20 | E3.fab.local |
| | | | VIDEO ANALYSIS MODULE | 10.0.4.10 | E4.mobile.local |
| | | | CAMERA CONTROL MODULE | 10.0.5.10 | IGW111 |
| | | | CONTROL DEVICE CONTROL MODULE | 10.0.5.20 | IGW111 |
| | | COMMUNICATION MODULE | BROADBAND COMMUNICATION MODULE | 10.0.3.254 | E3.fab.local |
| | | | BROADBAND COMMUNICATION MODULE | 10.0.5.254 | IGW111 |
| | | | HIGHLY-RELIABLE COMMUNICATION MODULE | 10.0.4.254 | E4.mobile.local |
| | | | HIGHLY-RELIABLE COMMUNICATION MODULE | 10.0.5.253 | IGW111 |
| | App-B | ... | ... | ... | ... |
| IGW 2222 | ... | ... | ... | ... | ... |

FIG. 17A

| MANAGEMENT IDENTIFIER ~1101 | TRANSMISSION SOURCE ADDRESS ~1102 | TRANSMISSION DESTINATION ADDRESS ~1103 | GATEWAY ~1104 |
|---|---|---|---|
| IGW 1111 | 10.0.2.10 (PRIMARY LEARNING MODULE) | ANY | Default |
| | 10.0.2.20 (DATA COLLECTION MODULE) | 10.0.5.10 (CAMERA CONTROL MODULE) | 10.0.2.254 (BROADBAND COMMUNICATION MODULE) |
| | ... | ANY | Default |
| | | ... | ... |

| MANAGEMENT IDENTIFIER 1101 | TRANSMISSION SOURCE ADDRESS 1102 | TRANSMISSION DESTINATION ADDRESS 1103 | GATEWAY 1104 |
|---|---|---|---|
| IGW 1111 | 10.0.5.10 (CAMERA CONTROL MODULE) | 10.0.2.20 (DATA COLLECTION MODULE) | 10.0.5.254 (BROADBAND COMMUNICATION MODULE) |
| | | ANY | Default |
| | 10.0.5.20 (CONTROL DEVICE CONTROL MODULE) | 10.0.4.10 (VIDEO ANALYSIS MODULE) | 10.0.5.253 (HIGHLY-RELIABLE COMMUNICATION MODULE) |
| | | ANY | Default |
| | ... | ... | ... |

DEPLOYMENT PROCESSING RESULT (1400)

| USER IDENTIFIER (501) | APPLICATION (601) | CLASSIFICATION (701) | MODULE (702) | MODULE ADDRESS (703) | ARRANGEMENT POSITION ADDRESS (704) |
|---|---|---|---|---|---|
| IGW 1111 | App-A | APPLICATION MODULE | SECONDARY LEARNING MODULE | 10.0.1.10 | C1.cloud.jp |
| | | | PRIMARY LEARNING MODULE | 10.0.2.10 | E2.mobile.jp |
| | | | DATA COLLECTION MODULE | 10.0.2.20 | E2.mobile.jp |
| | | | VIDEO ANALYSIS MODULE | 10.0.4.10 | E4.mobile.local |
| | | | CAMERA CONTROL MODULE | 10.0.5.10 | IGW111 |
| | | | CONTROL DEVICE CONTROL MODULE | 10.0.5.20 | IGW111 |
| | | COMMUNICATION MODULE | BROADBAND COMMUNICATION MODULE | 10.0.2.254 | E2.mobile.jp |
| | | | BROADBAND COMMUNICATION MODULE | 10.0.5.254 | IGW111 |
| | | | HIGHLY-RELIABLE COMMUNICATION MODULE | 10.0.4.254 | E4.mobile.local |
| | | | HIGHLY-RELIABLE COMMUNICATION MODULE | 10.0.5.253 | IGW111 |
| | App-B | ... | ... | ... | ... |
| IGW 2222 | ... | ... | ... | ... | ... |

MANAGEMENT APPARATUS, MANAGEMENT SYSTEM, AND MANAGEMENT METHOD

CLAIM OF PRIORITY

The present application claims priority from Japanese patent application JP 2022-012703 filed on Jan. 31, 2022, the content of which is hereby incorporated by reference into this application.

BACKGROUND OF THE INVENTION

1. Field of the Invention

The present invention relates to a management apparatus, a management system, and a management method for managing a module.

2. Description of the Related Art

The fifth-generation mobile communication (5G) enables low-delay, broadband, and highly-reliable wireless communication. Under such circumstances, various existing networks among private networks can be integrated by introducing a low-delay, broadband, and highly-reliable wireless network characterized by 5G, and it can be expected that costs of network construction and operation can be reduced. In particular, in a system in which a plurality of networks are mixed, such as a system including an operation technology (OT), an effect thereof is remarkable. Application of 5G to various fields has been studied. One example of an application destination thereof is a site network in manufacturing and distribution sites.

In the manufacturing and distribution sites, there is a demand for countermeasures against labor shortage, productivity improvement, and quality improvement by introducing new digital transformation (DX) solutions such as real-time work instructions utilizing high-definition video analysis, device control that enables people and robots to perform cooperative works, and remote control with realistic feeling.

By contrast, it has been studied to realize highly-reliable and flexible service provision including feedback control in a cyber-physical system by introducing a local 5G or a public 5G and a general-purpose edge processing server (also referred to as multi-access edge computing (MEC)) to integrate and aggregate a site network into a wireless network.

As a result, it can be expected that an application related to business can be flexibly and quickly changed due to factors such as a supply and demand fluctuation in a supply chain, a process change by personnel adjustment in a company, and fine work adjustment caused by a change in a site environment. The application mentioned herein is a program for achieving a certain purpose by combining a plurality of modules that provide some data input and output services. A change in a configuration of the application is to arbitrarily change a combination and a deployment position of the plurality of modules. The change in the configuration of the application is implemented by an instruction from a cloud by using the above-described factors as triggers. A network connecting these modules is required to provide highly-reliable connectivity following a configuration change.

JP 2020-140276 A below discloses a network requirement generation system that generates a network requirement applied to a service. The network requirement generation system includes a service requirement acquisition unit that includes a computer including an arithmetic device that executes predetermined arithmetic processing to realize each of the following functional units and a storage device accessible by the arithmetic device, and acquires a service requirement input by a user, a service requirement analysis unit that analyzes the input service requirement to generate a network requirement, and a network requirement control unit that creates a network setting content for a control device that constructs a network from the generated network requirement.

JP 2020-502948 A below discloses a network gateway for routing a data flow through a plurality of network connections. The network gateway includes a plurality of network interfaces including a first network interface for transmitting data through a plurality of network connections, and at least one processor. The processor is configured to transmit a sequential burst of packets through the first network interface, generates a bandwidth of the first network interface based on a timestamp and a size of the packet recorded when the packet in the sequential burst of packets is received at a receiving node, and route a data flow of the sequential packets through the plurality of network connections based on the generated bandwidth of the first network interface.

SUMMARY OF THE INVENTION

Problems in wireless networking of the site network corresponding to a strict application requirement required by the application in the OT will be described by taking a factory network as an example. In a current factory network, a plurality of networks such as a control network, an information network, and an office automation (OA) network are mixed according to a requirement of business. There are various requirements such as a communication delay and a communication utilization rate for the control device for each application.

The system is flexible by the wireless networking of the factory network, but the dependence on a system engineer increases. When the system engineer manually sets or constructs a system or a network to satisfy these requirements, the system engineer cannot follow a fluctuation in supply and demand, a change in site environment, or the like, and does not scale as business.

The network requirement generation system disclosed in JP 2020-140276 A does not disclose provision of highly-reliable communication connectivity required by the application by merely generating a setting of a network device. The network gateway disclosed in JP 2020-502948 A does not disclose a dynamic and flexible introduction method into the system.

An object of the present invention is to realize a setting of a communication path suitable for a request.

A management apparatus according to an aspect of the invention disclosed in the present application is a management apparatus that is able to communicate with a computer group. The apparatus includes a processor that executes a program, and a storage device that stores the program, The storage device stores an application module group, a communication module group, a communication path requirement that is a condition required for a communication path between an application module in the application module group and another application module as a communication partner of the application module, a communication path requirement target that designates the other application module, and a communication path requirement template group that includes a communication path requirement definition that defines a type and a condition of communication in the communication path requirement, an available communication module that defines a communication module available to the communication path requirement definition, and an available setting that defines a setting of communication available to the communication path requirement definition. The processor executes specification processing of specifying a first communication path requirement template corresponding to a first communication path requirement of a first application module from the communication path requirement template group, and specifying a second communication path requirement template corresponding to a second communication path requirement of a second application module designated as a communication partner of the first application module by the communication path requirement target from the communication path requirement template group, communication module determination processing of determining the available communication module included in the first communication path requirement template to be a first communication module available by the first application module, and determining the available communication module included in the second communication path requirement template to be a second communication module available by the second application module, communication module arrangement destination determination processing of determining an arrangement destination of the first communication module to be a first arrangement destination of the first application module in the computer group, and determining an arrangement destination of the second communication module to be a second arrangement destination of the second application module in the computer group, arrangement processing of arranging the first application module and the first communication module in the first arrangement destination and arranging the second application module and the second communication module in the second arrangement destination, and communication path setting processing of setting a communication path that connects the first application module and the second application module to be able to communicate via the first communication module and the second communication module.

According to the representative embodiment of the present invention, it is possible to realize the setting of the communication path suitable for the request. Other objects, configurations, and effects will be made apparent in the following descriptions of the embodiments.

BRIEF DESCRIPTION OF THE DRAWINGS

FIG. 4 is an explanatory diagram illustrating an example of an application;

FIG. 5 is an explanatory diagram illustrating an example of a resource management table;

FIG. 6 is an explanatory diagram illustrating an example of an application requirement table;

FIG. 7 is an explanatory diagram illustrating an example of an application management table;

FIG. 8 is an explanatory diagram illustrating an example of a communication module repository;

FIG. 9 is an explanatory diagram illustrating an example of a communication path requirement template table;

FIG. 11A is an explanatory diagram illustrating an example of a communication path management table retained by an edge processing server in a factory LAN;

FIG. 11B is an explanatory diagram illustrating an example of a communication path management table retained by an edge processing server in a local 5G network;

FIG. 11C is an explanatory diagram illustrating an example of a communication path management table retained by the IoT gateway;

FIG. 11D is an explanatory diagram illustrating an example of a communication path management table retained by a cloud processing server;

FIG. 14 is an explanatory diagram illustrating a display screen example of the orchestration server;

FIG. 17A is an explanatory diagram illustrating an example of a communication path management table after re-deployment retained by the edge processing server in a public 5G network;

FIG. 17B is an explanatory diagram illustrating an example of a communication path management table after re-deployment retained by the IoT gateway;

FIG. 19 is an explanatory diagram illustrating an example of a display screen of the orchestration server after re-deployment.

DESCRIPTION OF THE PREFERRED EMBODIMENTS

Edge Operation Management System

Figure 1:
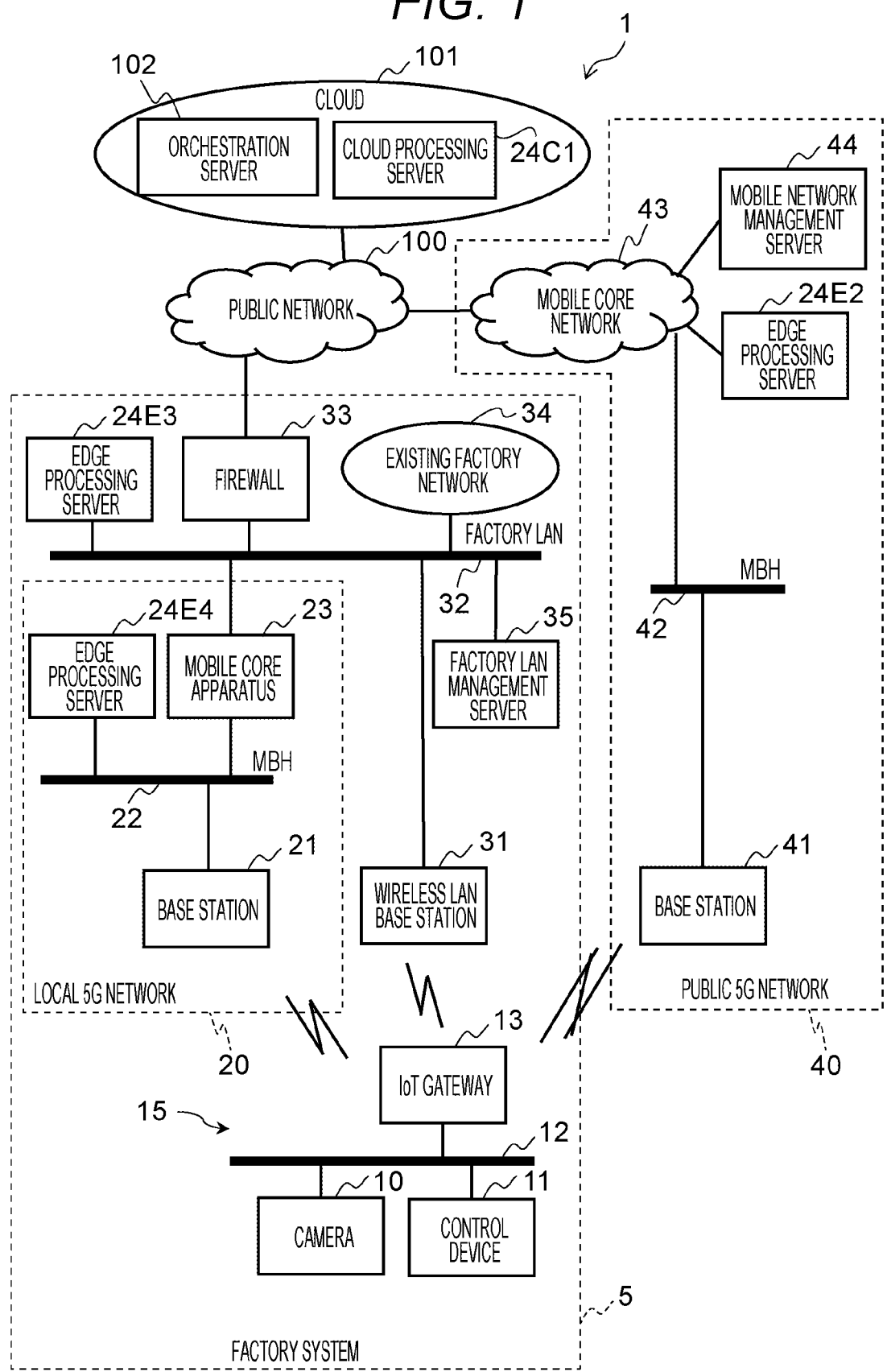
FIG. 1 is a block diagram illustrating a system configuration example of an edge operation management system.

FIG. 1 is a block diagram illustrating a system configuration example of an edge operation management system. An edge operation management system 1 includes a cloud 101 and a factory system 5. The cloud 101 and the factory system 5 are connected to be able to communicate via a public network 100. The cloud 101 and the factory system 5 are connected to a public 5G network 40 to be able to communicate via a public network 100.

The public 5G network 40 includes a base station 41, an edge processing server 24E2, and a mobile network management server 44. The base station 41, the edge processing server 24E2, and the mobile network management server 44 are connected to be able to communicate via a mobile core network 43. The mobile network management server 44 is connected to the public network 100 to be able to communicate. The mobile network management server 44 manages communication between the public 5G network 40, and an IoT gateway 13, a local 5G network 20, a factory local area network (LAN) 32, and the cloud 101 outside the public 5G network 40. The base station 41 can communicate with the mobile core network 43 via a mobile backhaul (MBH) 42.

The cloud 101 includes an orchestration server 102 and a cloud processing server 24C1. The orchestration server 102 is a management apparatus that controls the cloud processing server 24C1, the edge processing server 24E2, an edge processing server 24E3, and an edge processing server 24E4 to integrally set a virtualization environment and automate an operation of the virtualization environment.

The factory system 5 includes the edge processing server 24E3, the factory LAN 32, an existing factory network 34, a factory LAN management server 35, the local 5G network 20, a wireless LAN base station 31, and a terminal 15. The edge processing server 24E3, a firewall 33, the existing factory network 34, the factory LAN management server 35, the local 5G network 20, and the wireless LAN base station 31 are connected to be able to communicate via the factory LAN 32. The factory LAN management server 35 manages communication between the factory LAN 32, and the IoT gateway 13, the local 5G network 20, the cloud 101, and the public 5G network 40 outside the factory LAN 32.

The local 5G network 20 includes the edge processing server 24E4, a mobile core apparatus 23, the base station 21, and an MBH 22. The edge processing server 24E4, the mobile core apparatus 23, and the base station 21 are connected to be able to communicate via the MBH 22. The mobile core apparatus 23 is a generic name of an apparatus that accommodates long term evolution (LTE) or 5G mobile communication, and is also referred to as an evolved packet core (EPC) or a 5G core (5GC). The mobile core apparatus 23 manages communication between the local 5G network 20, and the IoT gateway 13, the factory LAN 32, the cloud 101, and the public 5G network 40 outside the local 5G network 20.

The terminal 15 is a computer including a camera 10, a control device 11, a bus 12, and the IoT gateway 13. The camera 10, the control device 11, and the IoT gateway 13 are connected to be able to communicate via a bus 12. The terminal 15 is connected to the base station 21, the wireless LAN base station 31, and the base station 41 to be able to communicate via the IoT gateway 13.

The camera 10 images a work machine such as a worker or a conveyor in the factory system 5. The control device 11 is connected to a work machine to be controlled, and gives control data such as a rotation speed of a roller to the work machine to control an operation of the work machine.

One terminal 15 is provided in the factory system 5. In a case where a plurality of manufacturing lines are present in the factory system 5, the terminal 15 is provided for each manufacturing line.

In a case where the edge processing server 24E2, the edge processing server 24E3, and the edge processing server 24E4 are not distinguished, these servers are simply referred to as an edge processing server 24E. In a case where the cloud processing server 24C1, the edge processing server 24E2, the edge processing server 24E3, and the edge processing server 24E4 are not distinguished, these servers are simply referred to as a processing server 24. The processing server 24 is a computer.

Hardware Configuration Example of Computer
(Orchestration Server 102, Processing Server 24, IoT Gateway 13)

Figure 2:
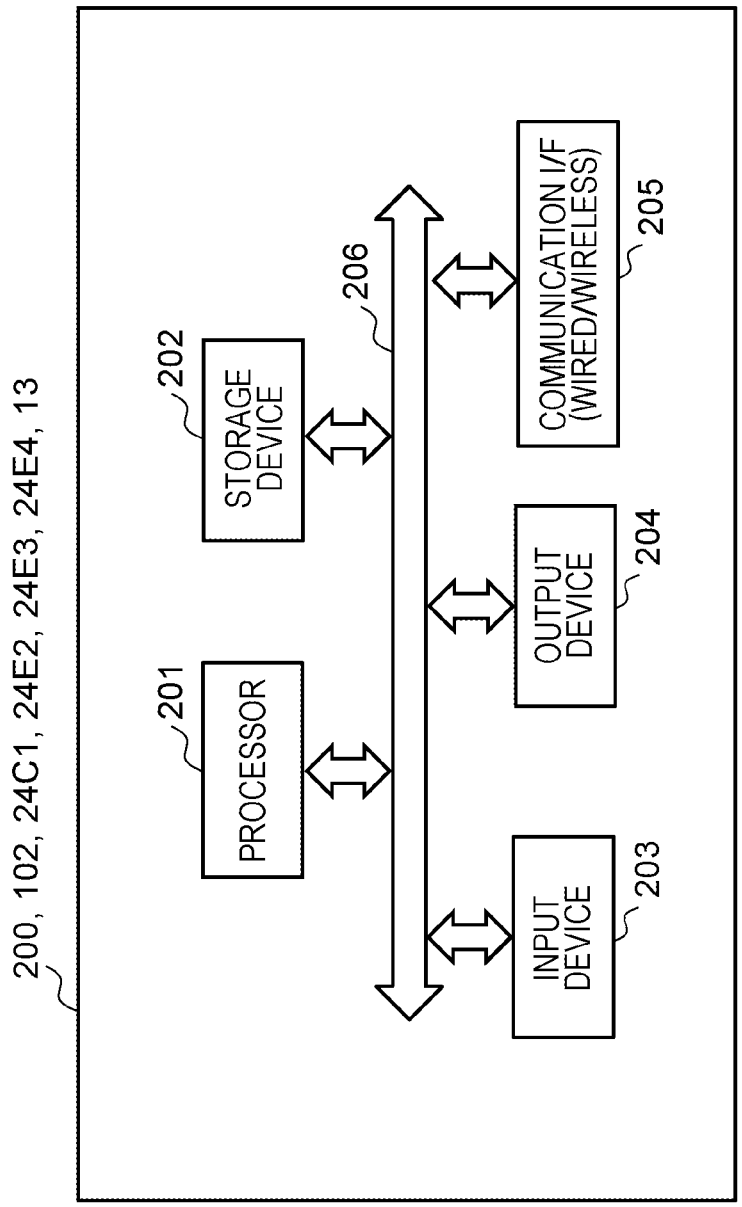
FIG. 2 is a block diagram illustrating a hardware configuration example of a computer.

FIG. 2 is a block diagram illustrating a hardware configuration example of a computer. A computer 200 includes a processor 201, a storage device 202, an input device 203, an output device 204, and a communication interface (communication IF) 205. The processor 201, the storage device 202, the input device 203, the output device 204, and the communication IF 205 are connected by a bus 206. The processor 201 controls the computer 200. The storage device 202 is a work area of the processor 201. The storage device 202 is a non-transitory or transitory recording medium that stores various programs and data. Examples of the storage device 202 include a read only memory (ROM), a random access memory (RAM), a hard disk drive (HDD), and a flash memory. The input device 203 inputs data. Examples of the input device 203 include a keyboard, a mouse, a touch panel, a numeric keypad, a scanner, a microphone, and a sensor. The output device 204 outputs data. Examples of the output device 204 include a display, a printer, and a speaker. The communication IF 205 is connected to a network to transmit and receive data. Hereinafter, embodiments according to the present invention will be described.

Functional Configuration Example of Orchestration Server 102

Figure 3:
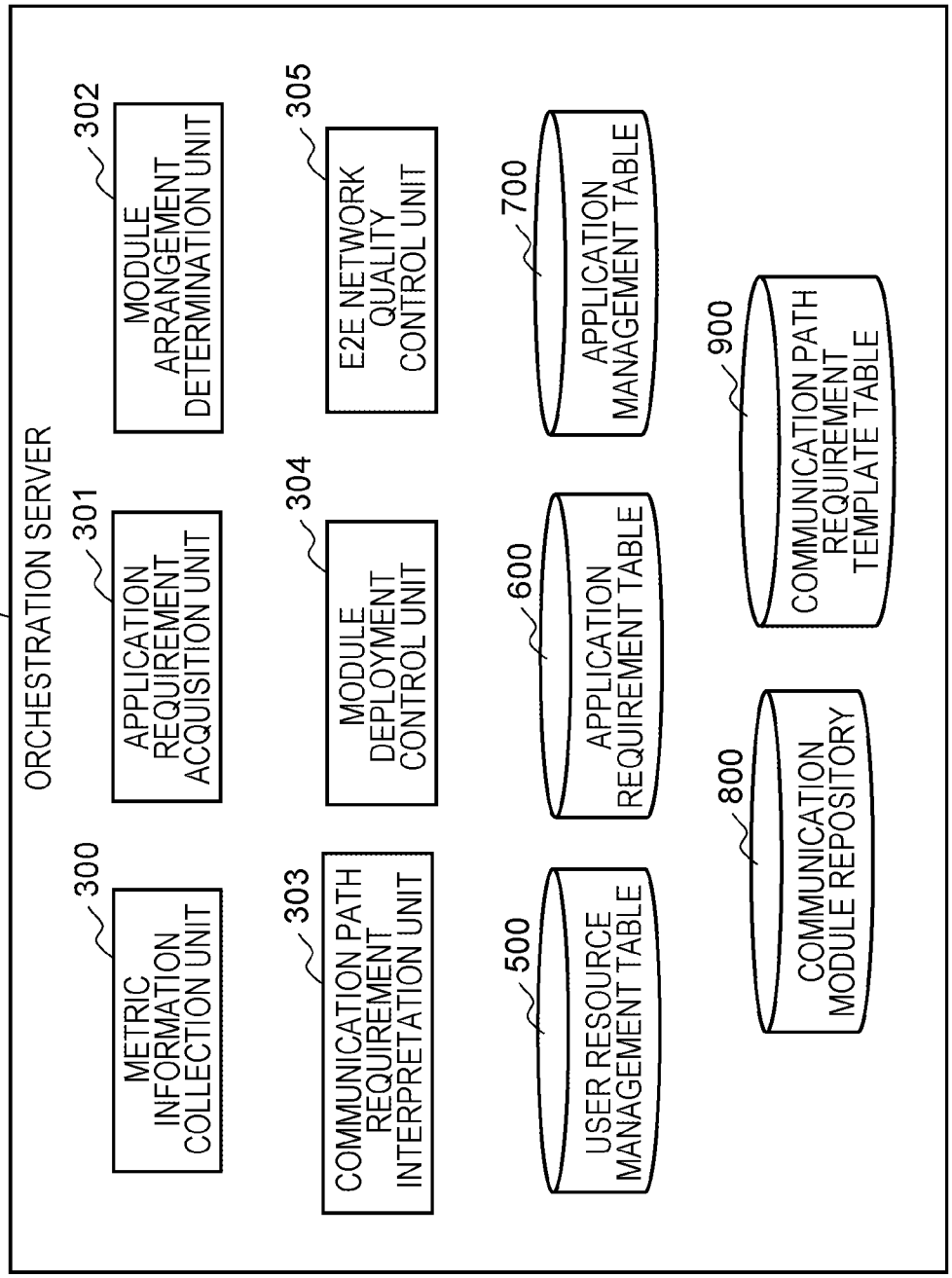
FIG. 3 is a block diagram illustrating a functional configuration example of an orchestration server.

FIG. 3 is a block diagram illustrating a functional configuration example of the orchestration server 102. The orchestration server 102 includes a metric information collection unit 300, an application requirement acquisition unit 301, a module arrangement determination unit 302, a communication path requirement interpretation unit 303, a module deployment control unit 304, an E2E network quality control unit 305, a resource management table 500, an application requirement table 600, an application management table 700, a communication module repository 800, and a communication path requirement template table 900.

Specifically, the metric information collection unit 300, the application requirement acquisition unit 301, the module arrangement determination unit 302, the communication path requirement interpretation unit 303, the module deployment control unit 304, and the E2E network quality control unit 305 are realized by causing the processor 201 to execute a program stored in the storage device 202 illustrated in FIG. 2, for example.

The metric information collection unit 300, the application requirement acquisition unit 301, the module arrangement determination unit 302, the communication path requirement interpretation unit 303, the module deployment control unit 304, and the E2E network quality control unit 305 are stored in the storage device 202.

The metric information collection unit 300 collects metric information from the processing server 24 and the IoT gateway 13. The metric information is information on a distance of a path (channel) to a communication partner, and is specifically, for example, a delay ([ms]), a jitter ([ms]), a bandwidth ([Mbps]), and a packet error rate (PER). The metric information collection unit 300 may collect and update the metric information at regular time intervals.

The application requirement acquisition unit 301 receives an input of an application requirement by receiving an input from an external computer or by an operation of an operator. The application requirement is a condition required for an application. The application is a software module group including an application module and a communication module. The application is retained in the cloud 101. In a case where the application module and the communication module are not distinguished from each other, these modules are simply referred to as a module.

The application module is a software module that processes data, and includes, for example, a learning module that executes machine learning, a data collection module that collects data, a video analysis module that analyzes video, a camera control module that controls the camera, and a control device control module that controls the control device.

The communication module is a module that transmits and receives data, and includes, for example, a broadband communication module that performs packet duplication transfer in a plurality of paths, a highly-reliable communication module that performs aggregation of a plurality of paths, a jitter reduction communication module that absorbs a packet jitter, and a WAF communication module that functions as a web application firewall (WAF).

The application requirement is defined for each module, and includes a condition of which modules are arranged where, what communication path requirement, and with whom. The communication path requirement is a condition required for the communication path, and includes a communication type such as control communication or media communication and a constraint condition thereof. The communication path is a communication channel between the module and a communication partner thereof.

The module arrange determination unit 302 determines an arrangement destination of the module. The arrangement destination includes, for example, ANY (anywhere), a closed area, and a field area. The closed area is in a device in which the module is arranged, and the field area indicates that the device in which the module is arranged is able to communicate with a plurality of networks.

The communication path requirement interpretation unit 303 interprets the communication path requirement. Specifically, for example, the communication path requirement interpretation unit 303 specifies a communication path requirement template corresponding to the communication path requirement of the arrangement destination of the module from the communication path requirement template table 900, and determines the communication module corresponding to the specified communication path requirement template.

The module deployment control unit 304 performs control such that the module is arranged at the arrangement destination of the module determined by the module arrangement determination unit 302. Specifically, for example, the module deployment control unit 304 transmits the module to the arrangement destination of the module determined by the module arrangement determination unit 302.

The E2E network quality control unit 305 controls END-TO-END, that is, the quality of the network present between the module arranged at the arrangement destination and the communication partner thereof. Specifically, for example, the E2E network quality control unit 305 executes quality of a service (QOS) setting and a communication path setting. Qos is an existing technology that adjusts the order and amount of data to enable stable use of services on a network.

Application

FIG. 4 is an explanatory diagram illustrating an example of an application. An application 400 includes a camera control module 401, a control device control module 402, a data collection module 403, a video analysis module 404, a primary learning module 405, and a secondary learning module 406.

The camera control module 401 instructs the camera 10 to capture an image and receives video data captured by the camera 10. The camera control module 401 transmits the video data to the data collection module 403 when the primary learning model is trained, and transmits the video data to the video analysis module when prediction using the primary learning model is performed.

The control device control module 402 acquires the control data set as the control target from the control device.

The control device control module 402 transmits the control data to the data collection module 403 when the primary learning model is trained, and transmits the control data to the video analysis module 404 when prediction using the primary learning model is performed.

The control device control module 402 transfers real-time feedback control data from the video analysis module 404 to the control device. The control device 11 controls the control target based on the real-time feedback control data. Specifically, for example, in a case where the real-time feedback control data is data indicating that the control data and the video data on which the video analysis is performed are normal works, the control device 11 continues the control of the control target as it is. On the other hand, in a case where the real-time feedback control data is data indicating that the control data and the video data on which the video analysis is performed are abnormal works deviated from each other, the control data is corrected. For example, in a case where a conveyance speed of the conveyor exceeds an upper limit speed, the control device 11 executes control to lower the number of rotations of the roller.

The data collection module 403 associates the video data with the control data by time, and transfers, as learning data, the data to the primary learning module.

The primary learning module 405 executes machine learning by using the learning data from the data collection module and correct answer data for each preset time, and generates a learning model. The correct answer data is, for example, an identification label for identifying whether the work at this time is a normal work or a deviated work. The primary learning module 405 transmits the generated primary learning model to the secondary learning module 406 and the video analysis module 404.

The video analysis module 404 executes video analysis by using the primary learning model. The video analysis module 404 inputs the video data from the camera control module 401 and the control data from the control device control module 402 to the primary learning model, calculates a prediction result indicating whether the work at this time is a normal work or a deviated work, and transmits, as the real-time feedback control data, the prediction result to the control device control module 402.

The secondary learning module 406 acquires the primary learning model from the primary learning module 405 and generates a secondary learning module. Specifically, for example, the secondary learning module 406 extracts only a feature common to a factory system group including the factory system 5 and another factory system, re-constructs a primary learning model, and generates the primary learning model as a secondary learning model as know-how.

Table Group in Orchestration Server 102

Next, a table group in the orchestration server 102 will be specifically described.

FIG. 5 is an explanatory diagram illustrating an example of the resource management table 500. The resource management table 500 is a table for managing computer resources available by the terminal 15. The resource management table 500 includes, as fields, a management identifier 501, an IoT device 502, a retainment interface 503, an available computer resource 504, a position 505, and metric information 506.

The management identifier 501 is an identifier for managing the computer resources available by the IoT device 502, and corresponds to the IoT device 502 on a one-to-one basis. The IoT device 502 defines an IoT device in the terminal 15. In the example of the terminal 15, the IoT device 502 is the IoT gateway 13.

The retainment interface 503 is a communication interface retained by the IoT device 502. In the example of the terminal 15, the IoT gateway 13 has an interface connectable to the base station 21 of the local 5G network 20, the wireless LAN base station 31, and the public 5G network 40.

The available computer resource 504 is a computer resource that is able to communicate with the IoT device 502 and is available by the application, and is, for example, a cloud processing server 24C1, an edge processing server 24E2, an edge processing server 24E3, and an edge processing server 24E4.

The position 505 indicates a location of the computer resource where the available computer resource 504 is present. Since the resource management table 500 defines an entry in units of the management identifier 501 indicating the IoT gateway, the position 505 of the IoT device 502 is also retained although not illustrated.

The metric information 506 is information on communication between the IoT device 502 and the available computer resource 504, and includes, as subfields, via local 5G 507, via wireless LAN 508, and via public 5G 509. The metric information 506 is recorded for each of the via local 5G 507, the via wireless LAN 508, and the via public 5G 509. The metric information 506 is collected by the metric information collection unit 300 as described above.

FIG. 6 is an explanatory diagram illustrating an example of the application requirement table 600. The application requirement table 600 is a table that defines the application requirement. The application requirement table 600 includes, as fields, an application identifier 601, an application module 602, an arrangement position 603, a communication path requirement target 604, a communication path requirement 605, and a communication path direction 606.

The application identifier 601 is identification information that uniquely specifies the application 400. In this example, "App-A" is the application identifier 601 of the application 400.

The application module 602 is a software module that constructs the application specified by the application identifier 601. In the example of the application 400, the application module 602 is the camera control module 401, the control device control module 402, the data collection module 403, the video analysis module 404, the primary learning module 405, and the secondary learning module 406.

The arrangement position 603 defines a position where the application module 602 can be arranged. The communication path requirement target 604 is a target that communicates with the application module 602 according to the communication path requirement 605, that is, a destination module in a case where the application module 602 is used as a transmission source. The communication path requirement 605 is a condition required for a communication path between the application modules 602, and includes a communication type such as control communication or media communication and a constraint condition thereof.

The communication path direction 606 defines a forward direction or a reverse direction as a direction of a communication path for an entry in which the communication path requirement 605 is present. The forward direction indicates a transmission direction from the application module 602 to the communication path requirement target 604, and the reverse direction indicates a transmission direction of data from the communication path requirement target 604 to the application module 602.

FIG. 7 is an explanatory diagram illustrating an example of the application management table 700. The application management table 700 is a table for managing a state after the application is arranged. The application management table 700 includes, as fields, a management identifier 501, an application identifier 601, a classification 701, a module 702, a module address 703, and an arrangement position address 704.

The classification 701 is a classification obtained by dividing the application specified by the application identifier 601 by type. In the example of the application 400, an application module and a communication module are included as the classification 701. The camera control module 401, the control device control module 402, the data collection module 403, the video analysis module 404, the primary learning module 405, and the secondary learning module 406 are classified into application modules. A broadband communication module and a highly-reliable communication module are classified into communication modules.

The module 702 defines in detail each of the application modules 602 and the communication modules classified by the classification 701.

The module address 703 is an IP address at the arrangement destination of the module 702. The module address 703 is assigned at the arrangement destination of the module 702. The arrangement position address 704 is an address of the arrangement destination of the module 702. In the example of FIG. 7, "C1.cloud.jp" is an address of the cloud processing server 24C1. "E3.fab.local" is an address of the edge processing server 24E3. "E4.mobile.local" is an address of the edge processing server 24E4. "IGW1111" is an address of the terminal 15.

FIG. 8 is an explanatory diagram illustrating an example of the communication module repository 800. The communication module repository 800 defines information on the communication module. The communication module repository 800 includes, as fields, a communication module name 801, a description 802, a provision form 803, a communication form 804, a configuration 805, and a storage destination 806.

The communication module name 801 is a name of the communication module divided by the classification 701. The description indicates a meaning of the communication module. The provision form 803 illustrates a form of providing the communication module. The communication form 804 indicates a form in which the communication module communicates. The configuration 805 illustrates a method in which the communication module communicates. The storage destination 806 indicates an address at which the communication module is stored.

FIG. 9 is an explanatory diagram illustrating an example of the communication path requirement template table 900. The communication path requirement template table 900 is a table that defines a template (hereinafter, the communication path requirement template) corresponding to the communication path requirement 605. The communication path requirement template table 900 includes, as fields, a communication path requirement definition 901, an available communication module 902, and an available setting 903. A combination of the communication path requirement definition 901, the available communication module 902, and the available setting 903 in the same row defines one communication path requirement template.

The communication path requirement definition 901 defines the communication path requirement 605. Specifically, for example, the communication path requirement definition 901 includes, as subfields, a classification 911 and a condition 912. The classification 911 is a classification obtained by classifying communication paths by type, and includes, for example, control communication, media communication, and secure communication. The control communication is a classification 911 of the communication path for communicating the control data. The media communication is a classification 911 of the communication path for communicating the video data. The secure communication is a classification 911 of the communication paths for securely the communicating data. The condition 912 is a constraint in a case where communication classified by the classification 911 is performed.

The available communication module 902 is a communication module available by the communication path requirement definition 901. The available setting 903 is a communication setting available in the available communication module 902 by the communication path requirement definition 901. In the available setting 903, more detailed constraints are defined than in the condition 912.

Exemplary Functional Configurations of Processing Server 24 and IoT Gateway 13

Figure 10:
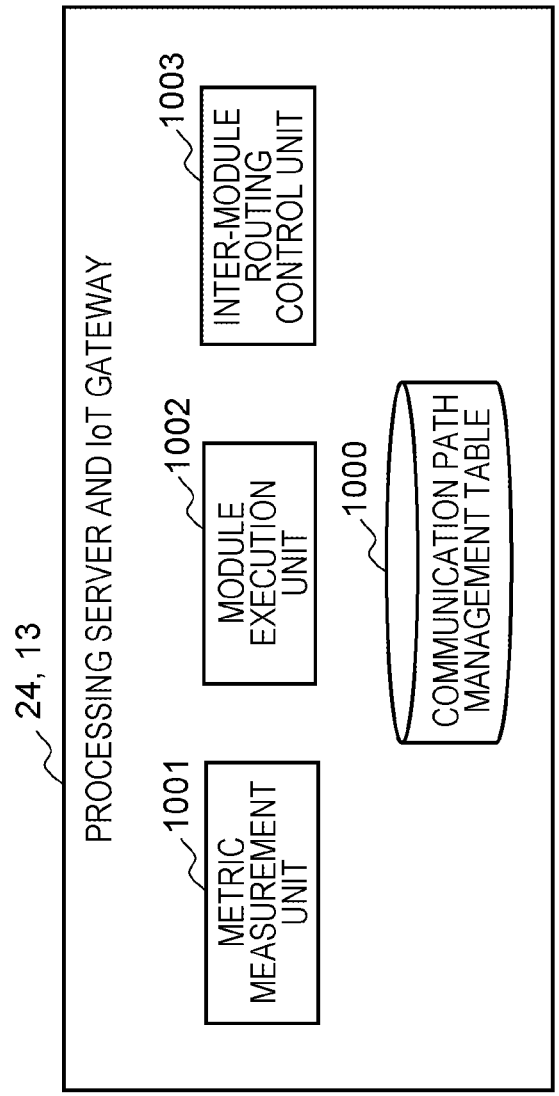
FIG. 10 is a block diagram illustrating a functional configuration example of a processing server and an IoT gateway.

FIG. 10 is a block diagram illustrating a functional configuration example of the processing server 24 and the IoT gateway 13. Each of the processing server 24 and the IoT gateway 13 includes a metric measurement unit 1001, a module execution unit 1002, an inter-module routing control unit 1003, and a communication path management table 1100.

Specifically, the metric measurement unit 1001, the module execution unit 1002, and the inter-module routing control unit 1003 are realized, for example, by causing the processor 201 to execute a program stored in the storage device 202 illustrated in FIG. 2. The communication path management table 1100 is stored in the storage device 202. The metric measurement unit 1001 measures the metric information and transmits the measured metric information to the orchestration server 102.

The module execution unit 1002 executes the module arranged from the orchestration server 102.

The inter-module routing control unit 1003 executes routing control with other modules.

Communication Path Management Table

The communication path management table is illustrated with reference to FIGS. 11A to 11D.

FIG. 11A is an explanatory diagram illustrating an example of a communication path management table 1100A retained by the edge processing server 24E3 in the factory LAN 32. FIG. 11B is an explanatory diagram illustrating an example of a communication path management table 1100B retained by the edge processing server 24E4 in the local 5G network 20. FIG. 11C is an explanatory diagram illustrating an example of a communication path management table 1100C retained by the IoT gateway 13. FIG. 11D is an explanatory diagram illustrating an example of a communication path management table 1100D retained by the cloud processing server 24C1. In a case where the communication path management tables 1100A to 1100D and a communication path management table 1100E to be described later in FIG. 17A are not distinguished, these tables are simply referred to as a communication path management table 1100.

The communication path management table 1100 includes, as fields, a management identifier 501, a transmission source address 1101, a destination address 1102, and a gateway 1103. The transmission source address 1101 is an address indicating a transmission source of a packet. The destination address 1102 is an address indicating a destination of the packet. The gateway 1103 is a gateway that is a transmission destination of the packet specified by the transmission source address 1101 and the destination address 1102.

For example, taking the communication path management table 1100A as an example, an entry in a first row indicates that a packet of which the transmission source is the primary learning module 405 (10.0.3.10) is sent to any destination (ANY) according to a routing table (not illustrated) of "Default". An entry in a second row indicates that a packet of which the transmission source is the data collection module 403 (10.0.3.20) is sent to a broadband communication module (10.0.3.254) which is the gateway 1103 in a case where the camera control module 401 (10.0.5.10) is the destination and is sent to a destination (ANY) other than the camera control module 401 (10.0.5.10) according to a routing table of "Default" (not illustrated).

Deployment Operation Sequence of Module

Figure 12:
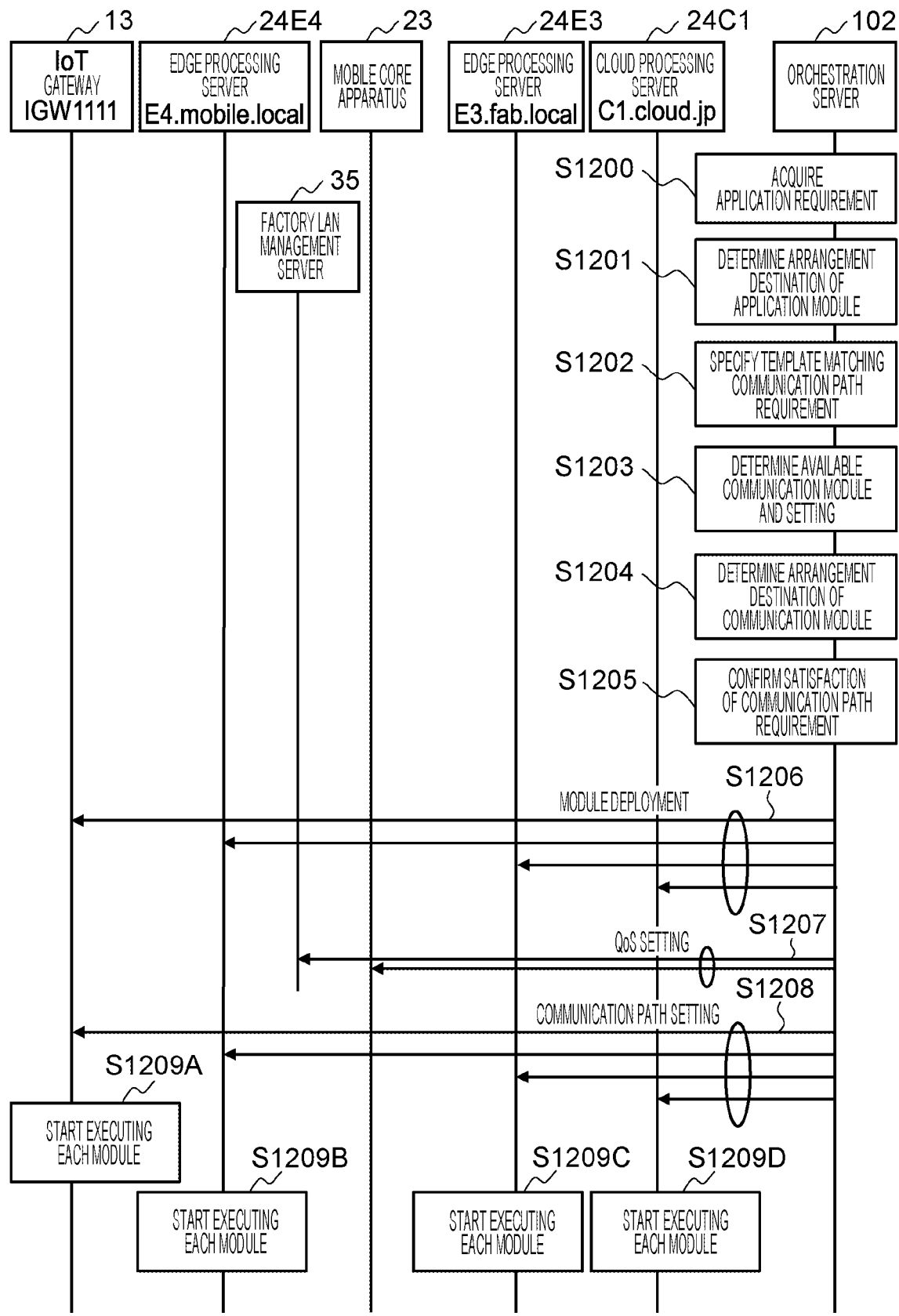
FIG. 12 is a sequence diagram illustrating an example of a deployment operation of a module.

FIG. 12 is a sequence diagram illustrating an example of a module deployment operation.

Step S1200

The orchestration server 102 acquires the application requirement for each application by the application requirement acquisition unit 301 and stores the application requirement in the application requirement table 600.

Step S1201

The orchestration server 102 determines the arrangement destination of the application module 602 by the module arrangement determination unit 302 while referring to the resource management table 500 and the application requirement table 600. Specifically, for example, the module arrangement determination unit 302 specifies the arrangement position 603 for each application module 602 while referring to the application requirement table 600. For example, the arrangement position is "closed area" for the data collection module 403, the video analysis module 404, and the primary learning module 405, the arrangement position is "field area" for the camera control module 401 and the control device control module 402, and the arrangement position is "ANY" for the secondary learning module 406.

The module arrangement determination unit 302 specifies the position 505 corresponding to the specified arrangement position 603 while referring to the resource management table 500. For example, in a case where the specified arrangement position 603 is "ANY", the module arrangement determination unit 302 determines the arrangement destination of the application module 602 to be the available computer resource 504 of which the position 505 is present in either "public area" or "closed area". In this example, the module arrangement determination unit 302 determines the arrangement destination of the secondary learning module 406 of which the arrangement position 603 is "ANY" to be the cloud processing server 24C1 of which the position 505 is "public area".

For example, in a case where the specified arrangement position 603 is "closed area", the position 505 is "closed area", and the available computer resource 504 that satisfies the communication path requirement 605 of the specified arrangement position 603 is determined to be the arrangement destination.

For example, in the case of the data collection module 403 and the primary learning module 405 of which the position 505 is "closed area", since the communication path requirement 605 is not defined, the module arrangement determination unit 302 may use any available computer resource 504 as the arrangement destination in a case where the position 505 is "closed area". In this case, the module arrangement determination unit 302 may determine the same available computer resource 504 as the other application modules 602 to be the arrangement destination, or may determine the available computer resource 504 different from the other application modules 602 to be the arrangement destination. In this example, the module arrangement determination unit 302 determines the arrangement destination of the data collection module 403 and the primary learning module 405 to be the edge processing server 24E3 of which the position 505 is "closed area".

For example, in the case of the video analysis module 404 of which the position 505 is "closed area", the communication path requirement 605 is "control communication" and "delay <20 [ms]". In this case, the module arrangement determination unit 302 determines the available computer resource 504 of which the position 505 is "closed area" and the delay (time) satisfies "delay <20 [ms]" of the communication path requirement 605 to be the arrangement destination. The available computer resources 504 of which the position 505 is "closed area" are the edge processing servers 24E2, 24E3, and 24E4.

Among the servers, the available computer resource 504 of which the delay (time) satisfies "delay <20 [ms]" of the communication path requirement 605 is the edge processing server 24E4 of the via local 5G 507. Accordingly, the module arrangement determination unit 302 determines the arrangement destination of the video analysis module 404 of which the position 505 is "closed area" to be the edge processing server 24E4 of the via local 5G 507.

For example, in a case where the specified arrangement position 603 is "field area", the module arrangement determination unit 302 determines the arrangement destination of the application modules 602 (camera control module 401 and control device control module 402) to be the IoT gateway 13 of the terminal 15.

In the module arrangement determination unit 302, the module 702 of the application management table 700 registers the address of the determined arrangement destination in the arrangement position address 704 of the entry which is the application module 602 of which the arrangement destination is determined.

In this manner, the arrangement destination of the secondary learning module 406 is determined to be the cloud processing server 24C1, the arrangement destination of the data collection module 403 and the primary learning module 405 is determined to be the edge processing server 24E3, the arrangement destination of the video analysis module 404 is determined to be the edge processing server 24E4 of the via local 5G 507, and the arrangement destination of the camera control module 401 and the control device control module 402 is determined to be the IoT gateway 13 of the terminal 15.

Step S1202

The orchestration server 102 specifies the communication path requirement template corresponding to the communication path requirement 605 of the application module 602 of which the arrangement destination is determined by the module arrangement determination unit 302 from the communication path requirement template table 900 of FIG. 9 by the communication path requirement interpretation unit 303.

Specifically, for example, in the application requirement table 600 of FIG. 6, since the communication path requirement 605 is "-", the communication path requirement interpretation unit 303 does not define the communication path requirement 605 for the primary learning module 405 and the secondary learning module 406. Accordingly, the communication path requirement interpretation unit 303 does not specify the communication path requirement template corresponding to the communication path requirement 605 for the primary learning module 405 and the secondary learning module 406.

On the other hand, in the application requirement table 600 of FIG. 6, the communication path requirement 605 from the camera control module 401 to the data collection module 403 is defined as "media communication" and "4K video×3". Accordingly, communication path requirement interpretation unit 303 specifies the communication path requirement templates (entry of which the classification 911 is "medial communication" and the condition 912 is "4K video×3" (N≥3)) corresponding to "media communication" and "4K video×3" from communication path requirement template table 900 of FIG. 9.

In application requirement table 600 of FIG. 6, the communication path requirement 605 from the video analysis module 404 to the control device control module 402 is defined as "control communication" and "delay <20 [ms]". Accordingly, the communication path requirement interpretation unit 303 specifies the communication path requirement templates (entry of which the classification 911 is "control communication" and the condition 912 is "delay <20 [ms]" (X≥20)) corresponding to "control communication" and "delay <20 [ms]" from the communication path requirement template table 900 of FIG. 9.

In the application requirement table 600 of FIG. 6, the communication path requirement 605 from the video analysis module 404 to the camera control module 401 is defined as "media communication" and "4K video×1". Accordingly, the communication path requirement interpretation unit 303 specifies the communication path requirement templates (entry of which the classification 911 is "media communication" and the condition 912 is "4K video×N" (N≥1)) corresponding to "media communication" and "4K video×1" from communication path requirement template table 900 of FIG. 9.

In this manner, the communication path requirement template for each communication path requirement target 604 of the application module 602 is specified.

Step S1203

The orchestration server 102 determines the available communication module 902 and the available setting 903 from the communication path requirement template specified in step S1202 by the module arrangement determination unit 302.

Specifically, for example, since the communication path requirement 605 is not defined, the module arrangement determination unit 302 does not specify the communication path requirement template for the data collection module 403, the primary learning module 405, and the secondary learning module 406. Accordingly, the module arrangement determination unit 302 does not determine the available communication module 902 and the available setting 903 for the data collection module 403, the primary learning module 405, and the secondary learning module 406.

In FIG. 9, the communication path requirement template of the video analysis module 404 as the application module 602 is an entry of which the classification 911 is "control communication" and the condition 912 is "delay <20 [ms]" (X≥20). Accordingly, the module arrangement determination unit 302 determines the available communication module 902 to be the highly-reliable communication module in the communication path requirement template (entry of which the classification 911 is "control communication" and the condition 912 is "delay <20 [ms]" (X≥20)) for the video analysis module 404 as the application module 602.

The module arrangement determination unit 302 specifies the metric information 506 of the edge processing server 24E4 of the via local 5G 507, which is the arrangement destination of the video analysis module 404 from the resource management table 500. The module arrangement determination unit 302 determines the available setting 903 of the highly-reliable communication module used by the video analysis module 404 to be the specified metric information (delay: 10 [ms], jitter: 10 [ms], bandwidth 80 [Mbps], PER: $10^{-4}$ (=0.01 [%])).

In this manner, the available communication module 902 in a case where the control device control module 402 and the video analysis module 404 communicate with each other is determined to be the highly-reliable communication module, and the available setting 903 is determined to be the metric information (delay: 10 [ms], jitter: 10 [ms], bandwidth 80 [Mbps], PER: $10^{-4}$ (=0.01 [%])).

In FIG. 9, the communication path requirement template of the camera control module 401 of which the communication path requirement target 604 is the data collection module 403 is an entry of which the classification 911 is "media communication" and the condition 912 is "4K video×N" (N≥3). Accordingly, the module arrangement determination unit 302 determines the available communication module 902 to be the broadband communication module in the communication path requirement template (the entry of which the classification 911 is "media communication" and the condition 912 is "4K video×N" (N≥3)) for the camera control module 401 of which the communication path requirement target 604 is the data collection module 403.

In a case where the arrangement destination of the application module 602 is the IoT device 502 (that is, the IoT gateway 13), the module arrangement determination unit 302 specifies the metric information 506 of the arrangement destination of the application module 602 of the communication path requirement target 604 from the resource management table 500.

In this case, the communication path requirement target 604 of the camera control module 401 is the data collection module 403, and the available communication module 902 is determined to be the broadband communication module. Accordingly, the module arrangement determination unit 302 specifies the metric information 506 of the edge processing server 24E3 which is the arrangement destination of the data collection module 403 from the resource management table 500.

Specifically, for example, in a case where the edge processing server 24E3 communicates with the camera control module 401 of the via local 5G 507, the module arrangement determination unit 302 specifies the metric information (delay: 30 [ms], jitter: 10 [ms], bandwidth 60 [Mbps], PER: $10^{-4}$ (=0.01 [%])) from the resource management table 500. In a case where the edge processing server 24E3 communicates with the camera control module 401 of the via wireless LAN 508, the module arrangement determination unit 302 specifies the metric information (delay: 30 [ms], jitter: 20 [ms], bandwidth 100 [Mbps], PER: 10–2 (=1 [%])) from the resource management table 500.

The module arrangement determination unit 302 determines the available setting 903 for the data collection module 403 determined to be the broadband communication module to be the specified metric information. Specifically, for example, the available setting 903 of the broadband communication module of the data collection module 403 is determined to be the metric information (delay: 30 [ms], jitter: 10 [ms], bandwidth 60 [Mbps], PER: $10^{-4}$ (=0.01 [%])) in a case where the edge processing server 24E3 communicates with the camera control module 401 of the via local 5G 507, and is determined to be the metric information (delay: 30 [ms], jitter: 20 [ms], bandwidth 100 [Mbps], PER: $10^{-2}$ (=1 [%])) in a case where the edge processing server 24E3 communicates with the camera control module 401 of the via wireless LAN 508.

In this manner, the available communication module 902 in a case where the data collection module 403 and the camera control module 401 communicate with each other is determined to be the broadband communication module.

The available setting 903 is determined to be the metric information corresponding to a communication scheme (the via local 5G 507 or the via wireless LAN 508) between the edge processing server 24E3 as the arrangement destination of the data collection module 403 and the camera control module 401.

In this manner, the available communication module 902 and the available setting 903 are determined for each specified communication path requirement template.

Step S1204

The orchestration server 102 determines the arrangement destination of the available communication module 902 by the module arrangement determination unit 302 while referring to the arrangement position address 704 of the application module 602 illustrated in FIG. 7.

Specifically, for example, the module arrangement determination unit 302 determines the arrangement destination of the highly-reliable communication module which is the available communication module 902 for each of the control device control module 402 and the video analysis module 404 for the highly-reliable communication module determined as the available communication module 902 in a case where the control device control module 402 and the video analysis module 404 communicate with each other.

More specifically, for example, the module arrangement determination unit 302 determines the arrangement destination of the available communication module 902 of the control device control module 402 to be "IGW1111" which is the same address as the arrangement position address 704 of the control device control module 402, and registers the arrangement destination in the arrangement position address 704.

Similarly, the module arrangement determination unit 302 determines the arrangement destination of the highly-reliable communication module which is the available communication module 902 of the video analysis module 404 to be "E4.mobile.local" which is the same address as the arrangement position address 704 of the video analysis module 404, and registers the arrangement destination in the arrangement position address 704.

The module arrangement determination unit 302 determines the arrangement destination of the broadband communication module which is the available communication module 902 for each of the data collection module 403 and the camera control module 401 for the broadband communication module determined as the available communication module 902 in a case where the data collection module 403 and the camera control module 401 communicate with each other.

More specifically, for example, the module arrangement determination unit 302 determines the arrangement destination of the broadband communication module which is the available communication module 902 of the data collection module 403 to be "E3.fab.local" which is the same address as the arrangement position address 704 of the data collection module 403, and registers the arrangement destination in the arrangement position address 704.

Similarly, the module arrangement determination unit 302 determines the arrangement destination of the broadband communication module which is the available communication module 902 of the camera control module 401 to be "IGW1111" which is the same address as the arrangement position address 704 of the camera control module 401, and registers the arrangement destination in the arrangement position address 704.

In this manner, the arrangement position address 704 of the available communication module 902 is determined.

Step S1205

The orchestration server 102 executes satisfaction confirmation of the communication path requirement 605 by the module arrangement determination unit 302.

Specifically, for example, the module arrangement determination unit 302 determines whether or not the metric information 506 determined in the available setting 903 satisfies the communication path requirement 605, notifies a supply source of the application requirement in step S1200 that the communication path requirement 605 is not satisfied in a case where there is the metric information 506 that does not satisfy, and deletes the entry of the application requirement registered in the application requirement table 600 and a value of the arrangement position address 704 of the application management table 700.

Step S1206

In a case where the communication path requirement 605 is satisfied in step S1205, the orchestration server 102 executes the module deployment by the module deployment control unit 304. Specifically, for example, the module deployment control unit 304 transmits the module 702 to the arrangement position address 704 according to the application management table 700 illustrated in FIG. 7.

As a result, the secondary learning module 406 is arranged in the cloud processing server 24C1. The primary learning module 405 and the data collection module 403 are arranged in the edge processing server 24E3. The broadband communication module which is the available communication module 902 of the data collection module 403 is also arranged in the edge processing server 24E3.

The video analysis module 404 is arranged in the edge processing server 24E4. The highly-reliable communication module which is the available communication module 902 of the video analysis module 404 is also arranged in the edge processing server 24E4.

The camera control module 401 and the control device control module 402 are arranged in the IoT gateway 13. The broadband communication module that is the available communication module 902 of the camera control module 401 is also arranged in the IoT gateway 13. The highly-reliable communication module which is the available communication module 902 of the control device control module 402 is also placed in the IoT gateway 13.

Step S1207

The orchestration server 102 executes a QoS setting for the factory LAN management server 35 and the mobile core apparatus 23 by the E2E network quality control unit 305. Specifically, for example, the E2E network quality control unit 305 executes a QoS setting so as to be the provision form 803, the communication form 804, and the configuration 805 corresponding to the communication module while referring to the communication module repository 800. For example, since communication between the data collection module 403 and the camera control module 401 is performed by the broadband communication module, the E2E network quality control unit 305 performs a QOS setting for each broadband communication module of the data collection module 403 and the camera control module 401 with the provision form 803 as a container, the communication form 804 as a gateway, and the configuration 805 as a point-to-point. For the content of the QoS setting, the orchestration server 102 follows the communication path Qos setting described in the available setting 903 for each communication module while referring to the communication path requirement template table 900 of FIG. 9.

Step S1208

The orchestration server 102 executes a communication path setting for the IoT gateway 13 and the processing server 24 in which the modules are arranged by the E2E network quality control unit 305. Specifically, for example, the E2E network quality control unit 305 sets the transmission source address 1101, the destination address 1102, and the gateway 1103 of the packet via the IoT gateway 13 and the processing server 24 in which the modules are arranged.

For example, for the edge processing server 24E3, the E2E network quality control unit 305 performs a setting such that the packet of which the transmission source address 1101 is "10.0.3.10" which is the module address 703 of the primary learning module 405 is sent according to a routing table (not illustrated) of "Default" to any destination address 1102 (ANY).

The E2E network quality control unit 305 performs a setting such that the packet of which the transmission source address 1101 is "10.0.3.20" which is the module address 703 of the data collection module 403 is sent to the broadband communication module (10.0.3.254) which is the gateway 1103 in a case where the module address 703 "10.0.5.10" of the camera control module 401 is the destination address 1102 and is sent according to a routing table (not illustrated) of the gateway 1103 of "Default" for the destination address 1102 (ANY) other than the camera control module 401 (10.0.5.10).

In this manner, a logical system by the deployment of the module is constructed.

Step S1209A

The IoT gateway 13 starts executing the module arranged from the orchestration server 102. Specifically, for example, the IoT gateway 13 starts executing the camera control module 401, the broadband communication module thereof, the control device control module 402, and the highly-reliable communication module thereof.

Step S1209B

The edge processing server 24E4 starts executing the module arranged from the orchestration server 102. Specifically, for example, the edge processing server 24E4 starts executing the video analysis module 404 and the highly-reliable communication module.

Step S1209C

The edge processing server 24E3 starts executing the module arranged from the orchestration server 102. Specifically, for example, the edge processing server 24E3 starts executing the data collection module 403, the highly-reliable communication module thereof, and the primary learning module 405.

Step S1209D

The cloud processing server 24C1 starts executing the module arranged from the orchestration server 102. Specifically, for example, the cloud processing server 24C1 starts executing the secondary learning module 406.

As a result, an operation of a logical system constructed by the deployment of the module is started.

Logical System after Deployment

Figure 13:
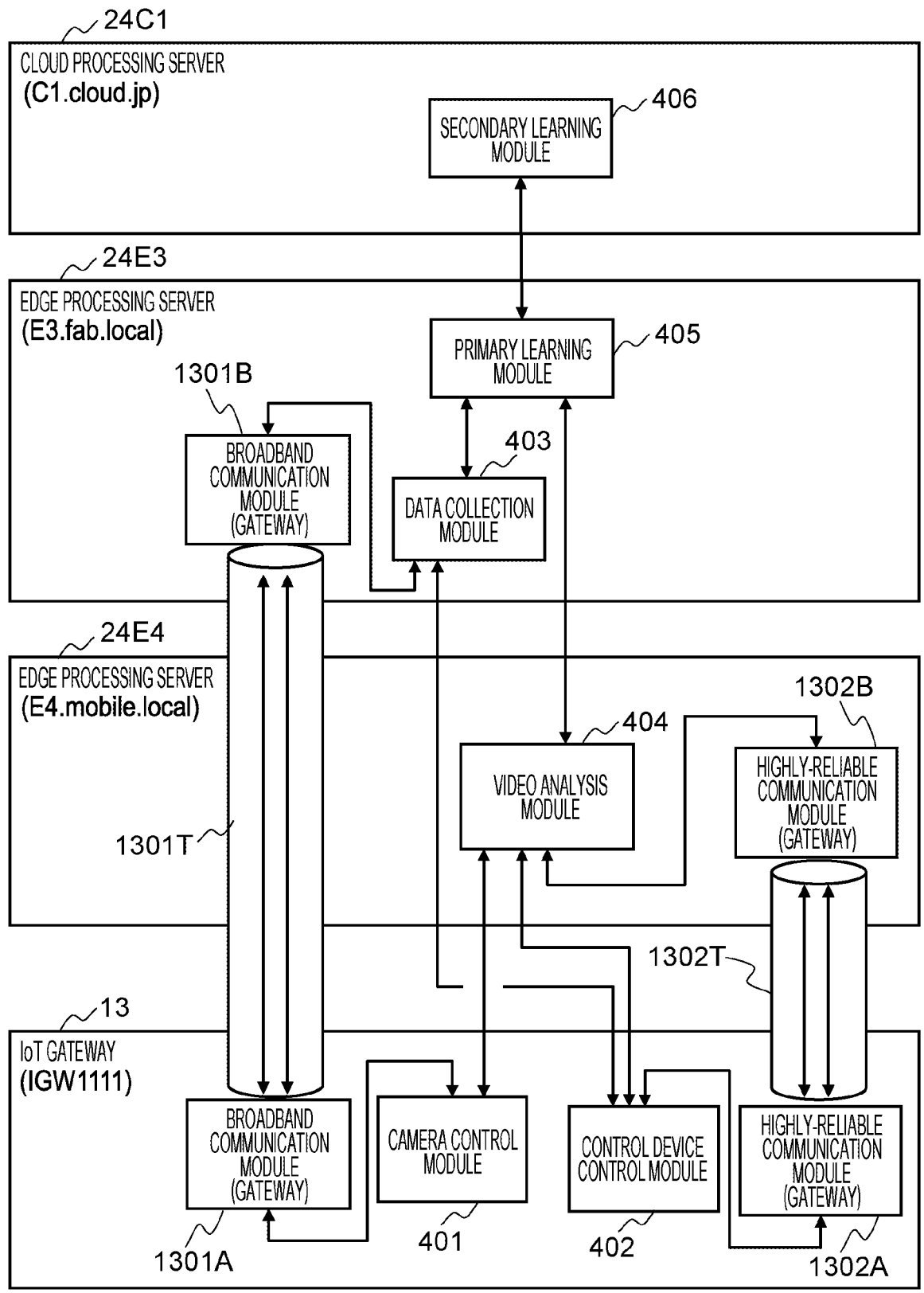
FIG. 13 is a block diagram illustrating a configuration example of a logical system after deployment of the module.

FIG. 13 is a block diagram illustrating a configuration example of a logical system after the deployment of the module. FIG. 13 illustrates a logical system constructed according to the sequence of FIG. 12. In FIG. 13, a bidirectional arrow between the modules indicates that both the modules can communicate with each other.

Communication between the data collection module 403 and the camera control module 401 is realized by broadband communication 1301T between a broadband communication module 1301B connected to the data collection module 403 and a broadband communication module 1301A connected to the camera control module 401. Communication between the video analysis module 404 and the control device control module 402 is realized by highly-reliable communication 1302T between a highly-reliable communication module 1302B connected to the video analysis module 404 and a highly-reliable communication module 1302A connected to the control device control module 402.

Display Screen Example of Orchestration Server 102

FIG. 14 is an explanatory diagram illustrating a display screen example of the orchestration server 102. A display screen 1400 of FIG. 14 displays, as a deployment processing result, the storage contents of the application management table 700 illustrated in FIG. 7.

Undeployment Operation Sequence of Application

Figure 15:
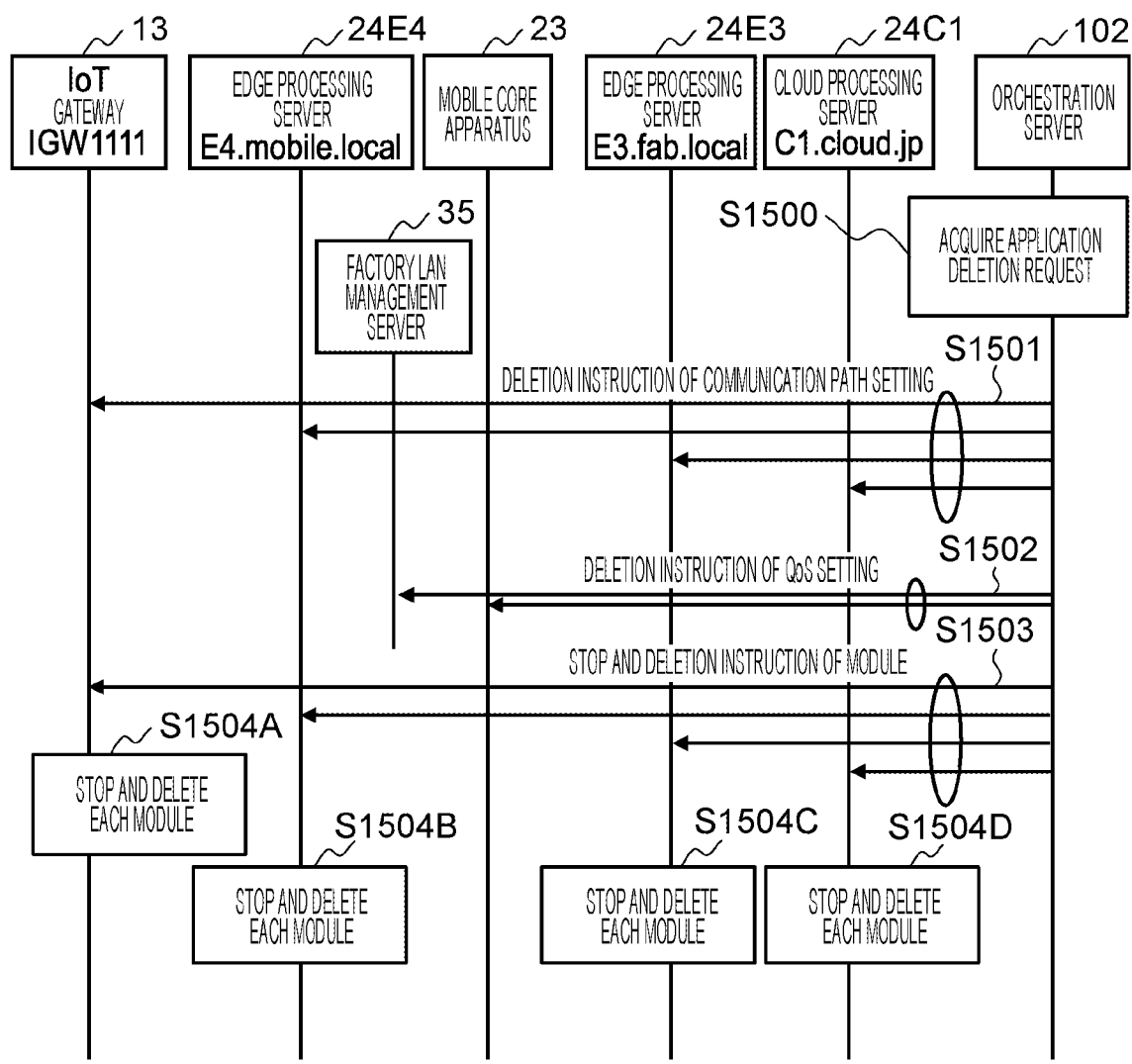
FIG. 15 is a sequence diagram illustrating an example of an undeployment operation of the module.

FIG. 15 is a sequence diagram illustrating an example of an undeployment operation of the module. The undeployment operation of the module of FIG. 15 indicates an operation after the deployment operation of the module of FIG. 12.

Step S1500

The orchestration server 102 acquires an application deletion request by the application requirement acquisition unit 301.

Step S1501

The orchestration server 102 transmits a deletion instruction of the communication path setting to the IoT gateway 13 and the processing server 24 for which the communication path setting is performed (step S1208) by the E2E network quality control unit 305.

Step S1502

The orchestration server 102 transmits a deletion instruction of the QOS setting to the factory LAN management server 35 and the mobile core apparatus 23 that have performed the QOS setting (step S1207) by the E2E network quality control unit 305. The factory LAN management server 35 deletes the QOS setting, and thus, communication between the edge processing server 24E3 and the IoT gateway 13 via the factory LAN 32 is interrupted. The mobile core apparatus 23 deletes the QOS setting, and thus, communication between the edge processing server 24E4 and the IoT gateway 13 via the local 5G network 20 is interrupted.

Step S1503

The orchestration server 102 transmits a deletion instruction of the module to the IoT gateway 13 and the processing server 24 in which the modules are arranged by the E2E network quality control unit 305.

Step S1504A

Upon receiving the deletion instruction in step S1501, the IoT gateway 13 deletes the entry of the management identifier 501 "IGW1111" serving as a deletion instruction target in the communication path management table 1100C. Upon receiving the deletion instruction in step S1503, the IoT gateway 13 deletes the arranged camera control module 401, the broadband communication module 1301A thereof, the control device control module 402, and the highly-reliable communication module 1302A thereof.

Step S1504B

Upon receiving the deletion instruction in step S1501, the edge processing server 24E4 deletes the entry of the management identifier 501 "IGW1111" serving as a deletion instruction target of the communication path management table 1100B. Upon receiving the deletion instruction in step S1503, the edge processing server 24E4 deletes the arranged video analysis module 404 and the highly-reliable communication module 1302B.

Step S1504C

Upon receiving the deletion instruction in step S1501, the edge processing server 24E3 deletes the entry of the management identifier 501 "IGW1111" serving as a deletion instruction target of the communication path management table 1100A. Upon receiving the deletion instruction in step S1503, the edge processing server 24E3 deletes the arranged data collection module 403, the highly-reliable communication module thereof, and the primary learning module 405.

Step S1504D

Upon receiving the deletion instruction in step S1501, the cloud processing server 24C1 deletes the entry of the management identifier "IGW1111" serving as a deletion instruction target of the communication path management table 1100D. Upon receiving the deletion instruction in step S1503, the cloud processing server 24C1 deletes the arranged secondary learning module 406.

In this manner, the module is undeployed from the processing server 24.

Re-Deployment Operation Sequence of Module

Figure 16:
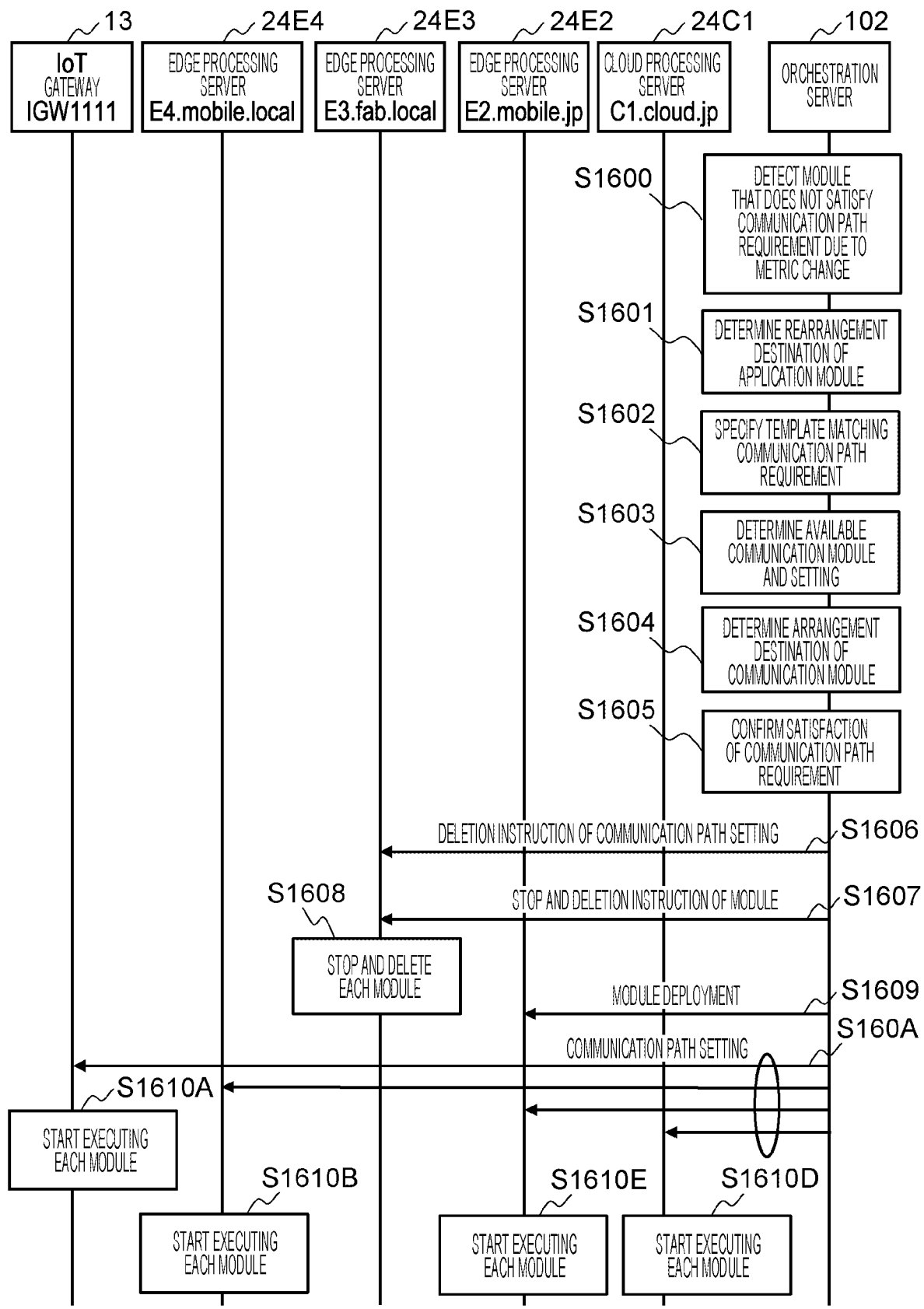
FIG. 16 is a sequence diagram illustrating an example of a re-deployment operation of the module.

FIG. 16 is a sequence diagram illustrating an example of a re-deployment operation of the module. The re-deployment is executed, for example, in a case where there is a change in the metric information 506. In FIG. 16, an example in which the video analysis module 404 and the highly-reliable communication module 1302B thereof are re-arranged in the edge processing server 24E2 in a case where the edge processing server 24E4 no longer satisfies the communication path requirement 605 of the video analysis module 404 which is the application module 602 arranged in the edge processing server 24E4 will be described.

Step S1600

The orchestration server 102 detects the application module 602 that does not satisfy the communication path requirement 605 due to the change in the metric information 506 by the metric information collection unit 300. Specifically, for example, the metric information collection unit 300 repeatedly collects the metric information 506 for each available computer resource 504, and detects whether the communication path requirement 605 of the application module 602 arranged in the available computer resource 504 is no longer satisfied.

In this example, the metric information collection unit 300 detects that the edge processing server 24E3 no longer satisfies the communication path requirement 605 (4K video×3) of the data collection module 403 arranged in the edge processing server 24E3.

Step S1601

In a case where the orchestration server 102 detects the application module 602 that does not satisfy the communication path requirement 605 in step S1600, the orchestration server 102 determines a re-arrangement destination of the application module 602 by the module arrangement determination unit 302 while referring to the resource management table 500 and the application requirement table 600 as in step S1201. In this example, a re-arrangement destination of the data collection module 403 is determined to be the edge processing server 24E2.

Steps S1602 to S1605

Steps S1602 to S1605 are the same processing as steps S1202 to S1205. In this example, a re-arrangement destination of the broadband communication module 1301B of the data collection module 403 is determined to be the edge processing server 24E2 in steps S1602 to S1605. Since the primary learning module 405 communicates with the data collection module 403 in the edge processing server 24E3, the orchestration server 102 may be re-arranged in the edge processing server 24E2 together with the data collection module 403 and the broadband communication module 1301B.

Step S1606

As in step S1501, the orchestration server 102 transmits a deletion instruction of the communication path setting to the edge processing server 24E3 which is an original arrangement destination of the data collection module 403, the broadband communication module 1301B, and the primary learning module 405.

Step S1607

As in step S1503, the orchestration server 102 transmits a deletion instruction of the data collection module 403, the broadband communication module 1301B, and the primary learning module 405 to the edge processing server 24E3 which is an original arrangement destination of the data collection module 403, the broadband communication module 1301B, and the primary learning module 405.

Step S1608

Upon receiving the deletion instruction in step S1606, the edge processing server 24E3 deletes the entry of the management identifier 501 "IGW1111" serving as a deletion instruction target of the communication path management table 1100A. Upon receiving the deletion instruction in step S1607, the edge processing server 24E3 deletes the data collection module 403, the broadband communication module 1301B, and the primary learning module 405.

Step S1607

The orchestration server 102 executes module deployment for the IoT gateway 13, the edge processing server 24E2, the edge processing server 24E4, and the cloud processing server 24C1 according to the processing results of steps S1601 to S1605 by the module deployment control unit 304.

In this manner, a logical system by the re-deployment of the module is constructed.

Step S1610A

The IoT gateway 13 starts executing the module arranged from the orchestration server 102. Specifically, for example, the IoT gateway 13 starts executing the camera control module 401, the broadband communication module 1301A, the control device control module 402, and the highly-reliable communication module 1302A.

Step S1610B

The edge processing server 24E4 starts executing the module arranged from the orchestration server 102. Specifically, for example, the edge processing server 24E2 starts executing the video analysis module 404 and the highly-reliable communication module 1302B.

Step S1610D

The cloud processing server 24C1 starts executing the module arranged from the orchestration server 102. Specifically, for example, the cloud processing server 24C1 starts executing the secondary learning module 406.

Step S1610E

The edge processing server 24E2 starts executing the module arranged from the orchestration server 102 in step S1609. Specifically, for example, the edge processing server 24E3 starts executing the data collection module 403, the broadband communication module 1301B, and the primary learning module 405.

As a result, an operation of a logical system constructed by the re-deployment of the module is started.

Communication Path Management Table 1100 after Re-Deployment

The communication path management table 1100 after re-deployment will be described with reference to FIGS. 17A and 17B.

FIG. 17A is an explanatory diagram illustrating an example of a communication path management table 1100E after re-deployment retained by the edge processing server 24E2 in the public 5G network 40. FIG. 17B is an explanatory diagram illustrating an example of the communication path management table 1100C after re-deployment retained by the IoT gateway 13.

As illustrated in FIG. 17A, after the re-deployment, the communication path management table 1100E of the edge processing server 24E2 is set instead of the communication path management table 1100A of the edge processing server 24E3.

In the communication path management table 1100E of the edge processing server 24E2 illustrated in FIG. 17A, an entry in a first row indicates that a packet of which the transmission source is the primary learning module 405 (10.0.2.10) is sent to the gateway 1103 of "Default" for any destination (ANY). An entry in a second line indicates that a packet of which the transmission source is the data collection module 403 (10.0.3.20) is sent to the broadband communication module (10.0.3.254) which is the gateway 1103 in a case where the camera control module 401 (10.0.5.10) is the destination and is sent to the gateway 1103 of "Default" for a destination (ANY) other than the camera control module 401 (10.0.5.10).

As illustrated in FIG. 17B, in the communication path management table 1100C of the IoT gateway 13, the address of the primary learning module 405 in a shaded portion of the transmission destination address 1103C is changed from "10.0.3.20" to "10.0.2.20" as compared with FIG. 11.

The communication path management table 1100B retained by the edge processing server 24E4 and the communication path management table 1100D retained by the cloud processing server 24C1 are not changed from the tables in FIGS. 11B and 11D even after re-deployment.

Logical System after Re-Deployment

Figure 18:
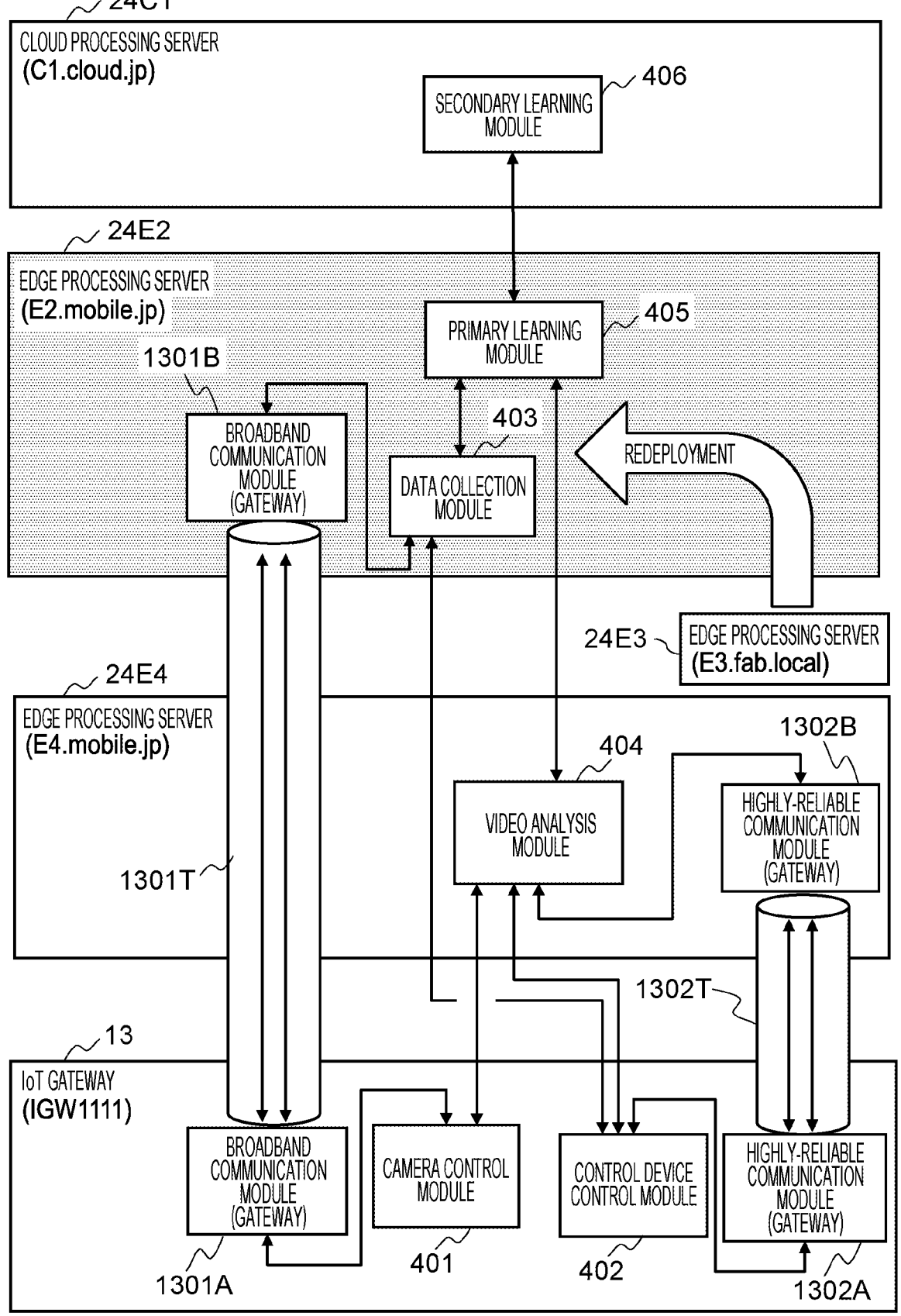
FIG. 18 is a block diagram illustrating a configuration example of a logical system after re-deployment of the module.

FIG. 18 is a block diagram illustrating a configuration example of a logical system after the re-deployment of the module. The difference from FIG. 13 is that the data collection module 403, the broadband communication module 1301B, and the primary learning module 405 are re-arranged from the edge processing server 24E3 of the factory LAN 32 to the edge processing server 24E2 of the public 5G network 40.

Display Screen Example of Orchestration Server 102 after Re-Deployment

FIG. 19 is an explanatory diagram illustrating a display screen example of the orchestration server 102 after re-deployment. As compared with FIG. 14, the module address 703 and the arrangement position address 704 of the broadband communication module 1301B and the primary learning module 405 are rewritten to the address of the edge processing server 24E2 as the re-deployment destination. The module address 703 and the arrangement position address 704 of the application management table 700 are updated as illustrated in FIG. 19.

In the re-deployment described above, although it has been described that the data collection module 403, the broadband communication module 1301B, and the primary learning module 405 are re-arranged from the edge processing server 24E3 of the factory LAN 32 to the edge processing server 24E2 of the public 5G network 40, the broadband communication module 1301A, the camera control module 401, the control device control module 402, and the highly-reliable communication module 1302A may be re-arranged in another IoT gateway 13.

As described above, according to the present embodiment, for example, it is possible to realize highly-reliable connectivity (communication path) such that a site network in a site such as manufacturing or distribution satisfies the application requirement requested by the application.

The present invention is not limited to the aforementioned embodiment, and includes various modification examples and equivalent configurations within the gist of the appended claims. For example, the aforementioned embodiment is described in detail in order to facilitate easy understanding of the present invention, and the present invention is not limited to necessarily including all the described components. A part of the configuration of one embodiment may be replaced with the configuration of another embodiment. The configuration of another embodiment may be added to the configuration of one embodiment. Another configuration may be added, removed, and substituted to, from, and into some of the configurations of the aforementioned embodiment.

A part or all of the aforementioned configurations, functions, processing units, and processing means may be realized by hardware by being designed with, for example, an integrated circuit. Alternatively, the processor interprets and executes a program for realizing the functions, and thus, a part or all of the aforementioned configurations, functions, processing units, and processing means may be realized by software.

Information of programs, tables, and files for realizing the functions can be stored in a storage device such as a memory, a hard disk, or a solid state drive (SSD), or a recording medium such as an integrated circuit (IC) card, an SD card, or a digital versatile disc (DVD).

Control lines and information lines illustrate lines which are considered to be necessary for the description, and not all the control lines and information lines necessary in the implementation are necessarily illustrated. Almost all the configurations may be considered to be actually connected to each other.

What is claimed is:
1. A management apparatus that is able to communicate with a computer group, the apparatus comprising:
a processor that executes a program; and
a storage device that stores the program, wherein
the storage device stores
an application module group,
a communication module group,
a communication path requirement that is a condition required for a communication path between an application module in the application module group and another application module as a communication partner of the application module,
a communication path requirement target that designates the other application module, and
a communication path requirement template group that includes a communication path requirement definition that defines a type and a condition of communication in the communication path requirement, an available communication module that defines a communication module available to the communication path requirement definition, and an available setting that defines a setting of communication available to the communication path requirement definition, and
the processor executes
specification processing of specifying a first communication path requirement template corresponding to a first communication path requirement of a first application module from the communication path requirement template group, and specifying a second communication path requirement template corresponding to a second communication path requirement of a second application module designated as a communication partner of the first application module by the communication path requirement target from the communication path requirement template group,
communication module determination processing of determining the available communication module included in the first communication path requirement template to be a first communication module available by the first application module, and determining the available communication module included in the second communication path requirement template to be a second communication module available by the second application module,
communication module arrangement destination determination processing of determining an arrangement destination of the first communication module to be a first arrangement destination of the first application module in the computer group, and determining an arrangement destination of the second communication module to be a second arrangement destination of the second application module in the computer group,
arrangement processing of arranging the first application module and the first communication module in the first arrangement destination and arranging the second application module and the second communication module in the second arrangement destination, and
communication path setting processing of setting a communication path that connects the first application module and the second application module to be able to communicate via the first communication module and the second communication module.

2. The management apparatus according to claim 1, wherein
the storage device stores
area information on a position of each of computers of the computer group, and
an arrangeable area of each application module of the application module group, and
the processor executes application module arrangement destination determination processing of determining the first arrangement destination from the computer group, and determining the second arrangement destination from the computer group based on the area information and the arrangeable area.

3. The management apparatus according to claim 1, wherein
the storage device stores a communication module repository that defines information on network quality corresponding to a type of the communication module, and
the processor executes quality setting processing of setting network quality corresponding to a type of each communication module of the first communication module and the second communication module while referring to the communication module repository.

4. The management apparatus according to claim 1, wherein
the processor executes deletion processing of transmitting a deletion instruction of the communication path to the first arrangement destination and the second arrangement destination, transmitting a stop or deletion instruction of the first application module and the first communication module to the first arrangement destination, and transmitting a stop or deletion instruction of the second application module and the second communication module to the second arrangement destination.

5. The management apparatus according to claim 2, wherein
the storage device stores metric information generated by communication between the computers, and
the processor executes
first detection processing of detecting that the first application module does not satisfy the first communication path requirement based on the metric information,
application module arrangement destination re-determination processing of determining a third arrangement destination different from the first arrangement destination from the computer group based on the area information and the arrangeable area for the first application module that does not satisfy the first communication path requirement in the first detection processing,
communication module arrangement destination re-determination processing of determining the arrangement destination of the first communication module to be the third arrangement destination,
re-arrangement processing of arranging the first application module and the first communication module in the third arrangement destination, and
communication path re-setting processing of setting a communication path that connects the first application module arranged in the third arrangement destination and the second application module to be able to communicate via the first communication module arranged in the third arrangement destination and the second communication module.

6. The management apparatus according to claim 2, wherein
the storage device stores metric information generated by communication between the computers, and
the processor executes
second detection processing of detecting that the second application module does not satisfy the second communication path requirement based on the metric information,
application module arrangement destination re-determination processing of determining a fourth arrangement destination different from the second arrangement destination from the computer group based on the area information and the arrangeable area for the second application module that does not satisfy the second communication path requirement in the second detection processing,
communication module arrangement destination re-determination processing of determining the arrangement destination of the second communication module to be the fourth arrangement destination,
re-arrangement processing of arranging the second application module and the second communication module in the fourth arrangement destination, and
communication path re-setting processing of setting a communication path that connects the first application module and the second application module arranged in the fourth arrangement destination to be able to communicate via the first communication module and the second communication module re-arranged in the fourth arrangement destination.

7. The management apparatus according to claim 5, wherein
the processor executes second detection processing of detecting that the second application module does not satisfy the second communication path requirement based on the metric information,
in the application module arrangement destination re-determination processing, the processor determines a fourth arrangement destination different from the second arrangement destination from the computer group based on the area information and the arrangeable area for the second application module that does not satisfy the second communication path requirement in the second detection processing,
in the communication module arrangement destination re-determination processing, the processor determines the arrangement destination of the second communication module to the fourth arrangement destination,
in the re-arrangement processing, the processor arranges the second application module and the second communication module in the fourth arrangement destination, and
in the communication path re-setting processing, the processor sets a communication path that connects the first application module re-arranged in the third arrangement destination and the second application module re-arranged in the fourth arrangement destination to be able to communicate via the first communication module re-arranged in the third arrangement destination and the second communication module re-arranged in the fourth arrangement destination.

8. A management system that includes a computer group and a management apparatus that is able to communicate with the computer group, wherein
the management apparatus stores
an application module group,
a communication module group,
a communication path requirement that is a condition required for a communication path between an application module in the application module group and another application module as a communication partner of the application module,
a communication path requirement target that designates the other application module, and
a communication path requirement template group that includes a communication path requirement definition that defines a type and a condition of communication in the communication path requirement, an available communication module that defines a communication module available to the communication path requirement definition, and an available setting that defines a setting of communication available to the communication path requirement definition, and the management apparatus executes specification processing of specifying a first communication path requirement template corresponding to a first communication path requirement of a first application module from the communication path requirement template group, and specifying a second communication path requirement template corresponding to a second communication path requirement of a second application module designated as a communication partner of the first application module by the communication path requirement target from the communication path requirement template group, communication module determination processing of determining the available communication module included in the first communication path requirement template to be a first communication module available by the first application module, and determining the available communication module included in the second communication path requirement template to be a second communication module available by the second application module, communication module arrangement destination determination processing of determining an arrangement destination of the first communication module to be a first arrangement destination of the first application module in the computer group, and determining an arrangement destination of the second communication module to be a second arrangement destination of the second application module in the computer group, arrangement processing of arranging the first application module and the first communication module in the first arrangement destination and arranging the second application module and the second communication module in the second arrangement destination, and communication path setting processing of setting a communication path that connects the first application module and the second application module to be able to communicate via the first communication module and the second communication module.

9. A management method by a management apparatus that is able to communicate with a computer group, wherein the management apparatus includes a processor that executes a program, and a storage device that stores the program, the storage device stores an application module group, a communication module group, a communication path requirement that is a condition required for a communication path between an application module in the application module group and another application module as a communication partner of the application module, a communication path requirement target that designates the other application module, and a communication path requirement template group that includes a communication path requirement definition that defines a type and a condition of communication in the communication path requirement, an available communication module that defines a communication module available to the communication path requirement definition, and an available setting that defines a setting of communication available to the communication path requirement definition, and the processor executes specification processing of specifying a first communication path requirement template corresponding to a first communication path requirement of a first application module from the communication path requirement template group, and specifying a second communication path requirement template corresponding to a second communication path requirement of a second application module designated as a communication partner of the first application module by the communication path requirement target from the communication path requirement template group, communication module determination processing of determining the available communication module included in the first communication path requirement template to be a first communication module available by the first application module, and determining the available communication module included in the second communication path requirement template to be a second communication module available by the second application module, communication module arrangement destination determination processing of determining an arrangement destination of the first communication module to be a first arrangement destination of the first application module in the computer group, and determining an arrangement destination of the second communication module to be a second arrangement destination of the second application module in the computer group, arrangement processing of arranging the first application module and the first communication module in the first arrangement destination and arranging the second application module and the second communication module in the second arrangement destination, and communication path setting processing of setting a communication path that connects the first application module and the second application module to be able to communicate via the first communication module and the second communication module.

\* \* \* \* \*